United States Patent [19]

Amacher et al.

[11] 4,253,018
[45] Feb. 24, 1981

[54] SYMBOL DECODING SYSTEM

[75] Inventors: Gene L. Amacher; Syed Naseem, both of Cambridge, Ohio

[73] Assignee: NCR Corporation, Dayton, Ohio

[21] Appl. No.: 43,933

[22] Filed: May 30, 1979

[51] Int. Cl.$^3$ ............................................. G06K 7/10
[52] U.S. Cl. ................................... 235/463; 250/568
[58] Field of Search ................ 235/463, 449; 250/555, 250/566, 568, 569; 340/146.3 Z

[56] References Cited

U.S. PATENT DOCUMENTS

| | | | |
|---|---|---|---|
| 3,906,203 | 9/1975 | Butulis | 235/463 |
| 4,095,096 | 6/1978 | Harada et al. | 235/463 |
| 4,125,765 | 11/1978 | Cowardin | 235/463 |
| 4,146,046 | 3/1979 | Dobras | 235/463 |
| 4,146,782 | 3/1979 | Barnich | 235/463 |

Primary Examiner—Daryl W. Cook
Attorney, Agent, or Firm—J. T. Cavender; Wilbert Hawk, Jr.; Richard W. Lavin

[57] ABSTRACT

A symbol decoding system incorporated in a NMOS/LSI chip generates asynchronously binary data in response to the scanning of bars and spaces of the symbol. The binary data may represent each bar or space as a numerical character, a margin or a center band of the symbol. The binary data also includes data identifying the bar or space and if the character generated is valid or invalid. Logic circuits generate a time delay period allowing the binary data to be generated asynchronously during the delay period. At the end of the delay period the binary data is outputted to a utilizing device for selecting the valid data from the data outputted by the decoding system.

20 Claims, 34 Drawing Figures

| DECIMAL NUMBER | LEFT SIDE (ODD PARITY) | RIGHT SIDE (EVEN PARITY) |
|---|---|---|
| 0 | 0 0 0 1 1 0 1 | 1 1 1 0 0 1 0 |
| 1 | 0 0 1 1 0 0 1 | 1 1 0 0 1 1 0 |
| 2 | 0 0 1 0 0 1 1 | 1 1 0 1 1 0 0 |
| 3 | 0 1 1 1 1 0 1 | 1 0 0 0 0 1 0 |
| 4 | 0 1 0 0 0 1 1 | 1 0 1 1 1 0 0 |
| 5 | 0 1 1 0 0 0 1 | 1 0 0 1 1 1 0 |
| 6 | 0 1 0 1 1 1 1 | 1 0 1 0 0 0 0 |
| 7 | 0 1 1 1 0 1 1 | 1 0 0 0 1 0 0 |
| 8 | 0 1 1 0 1 1 1 | 1 0 0 1 0 0 0 |
| 9 | 0 0 0 1 0 1 1 | 1 1 1 0 1 0 0 |

1 : BLACK    0 : WHITE

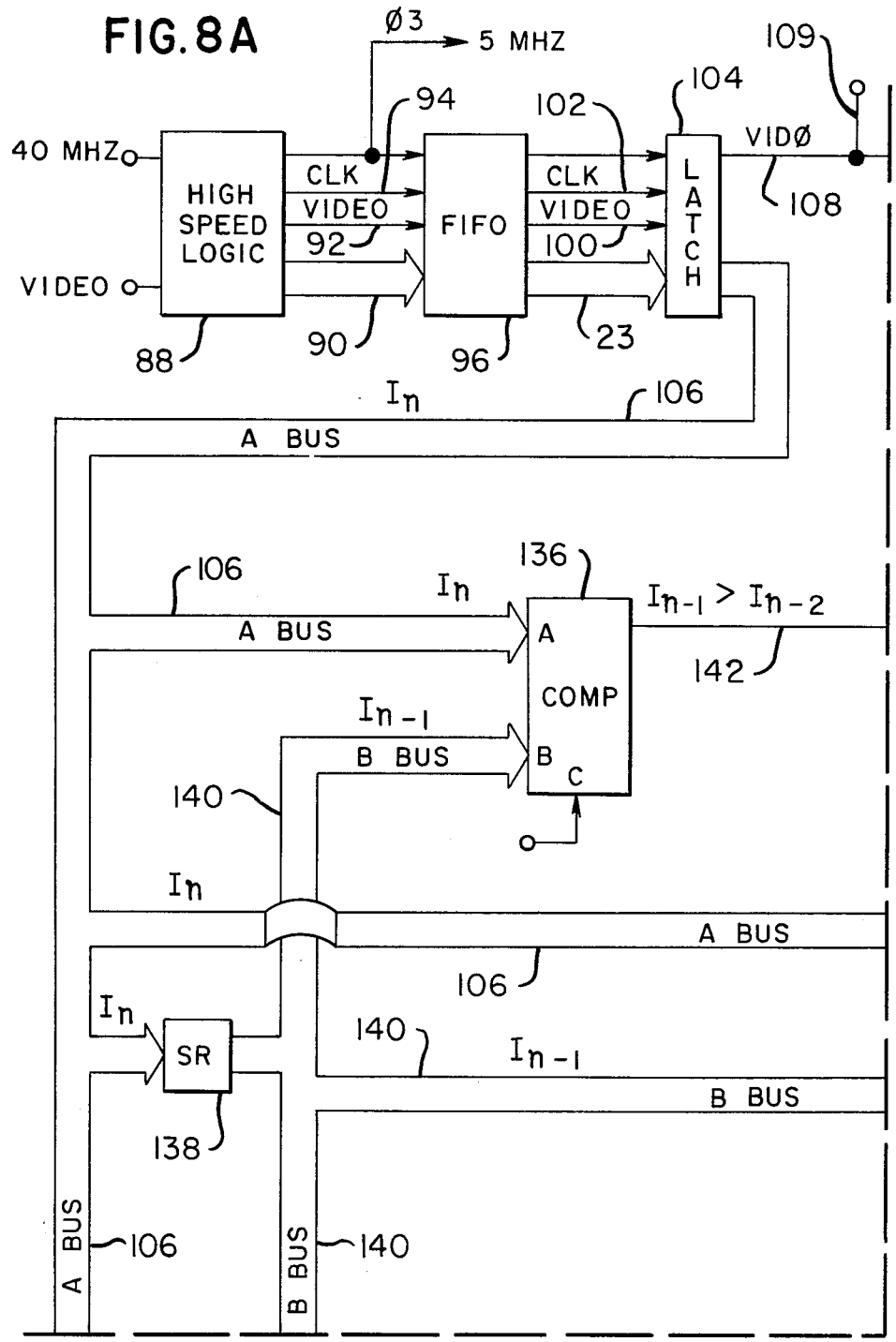

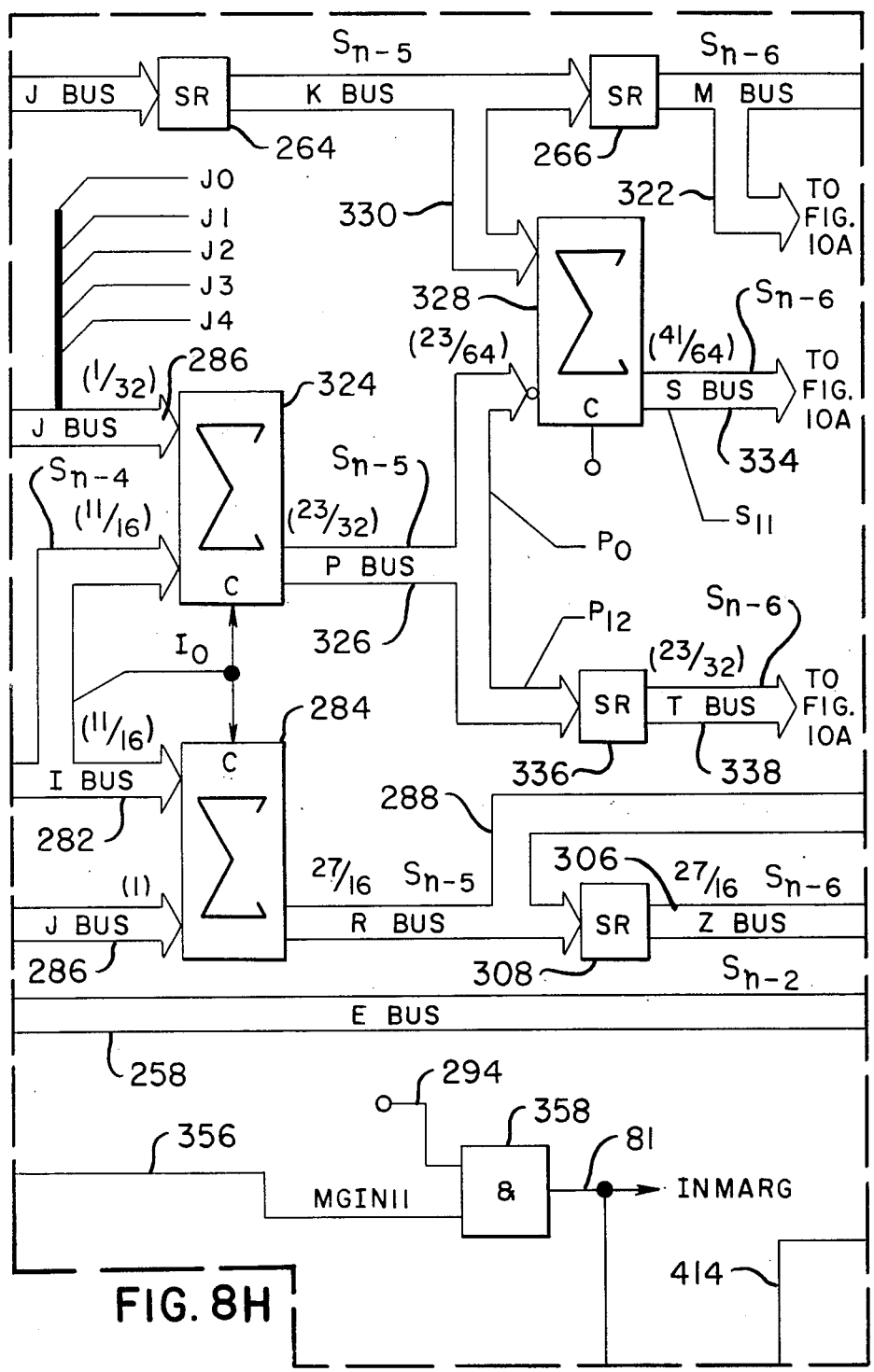

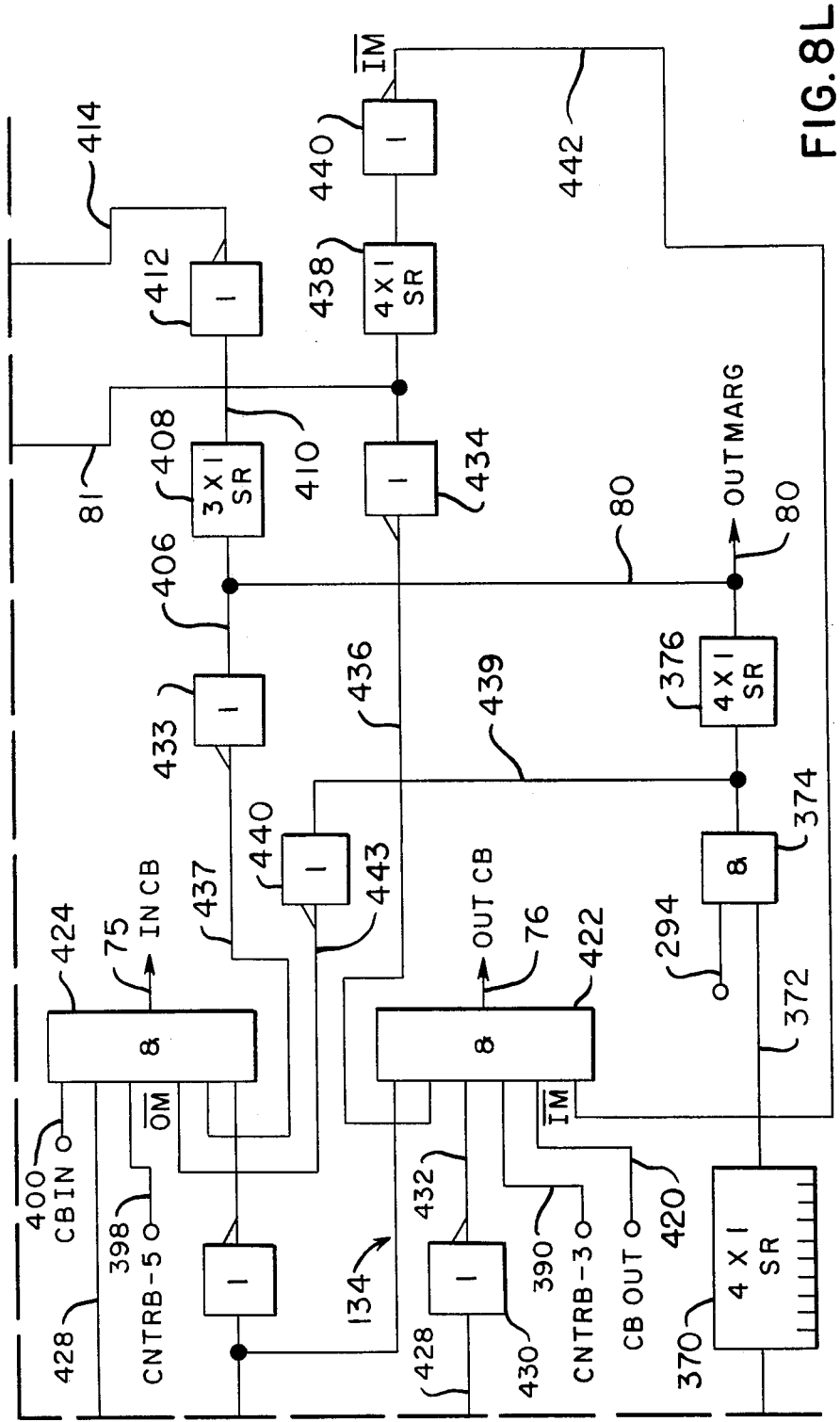

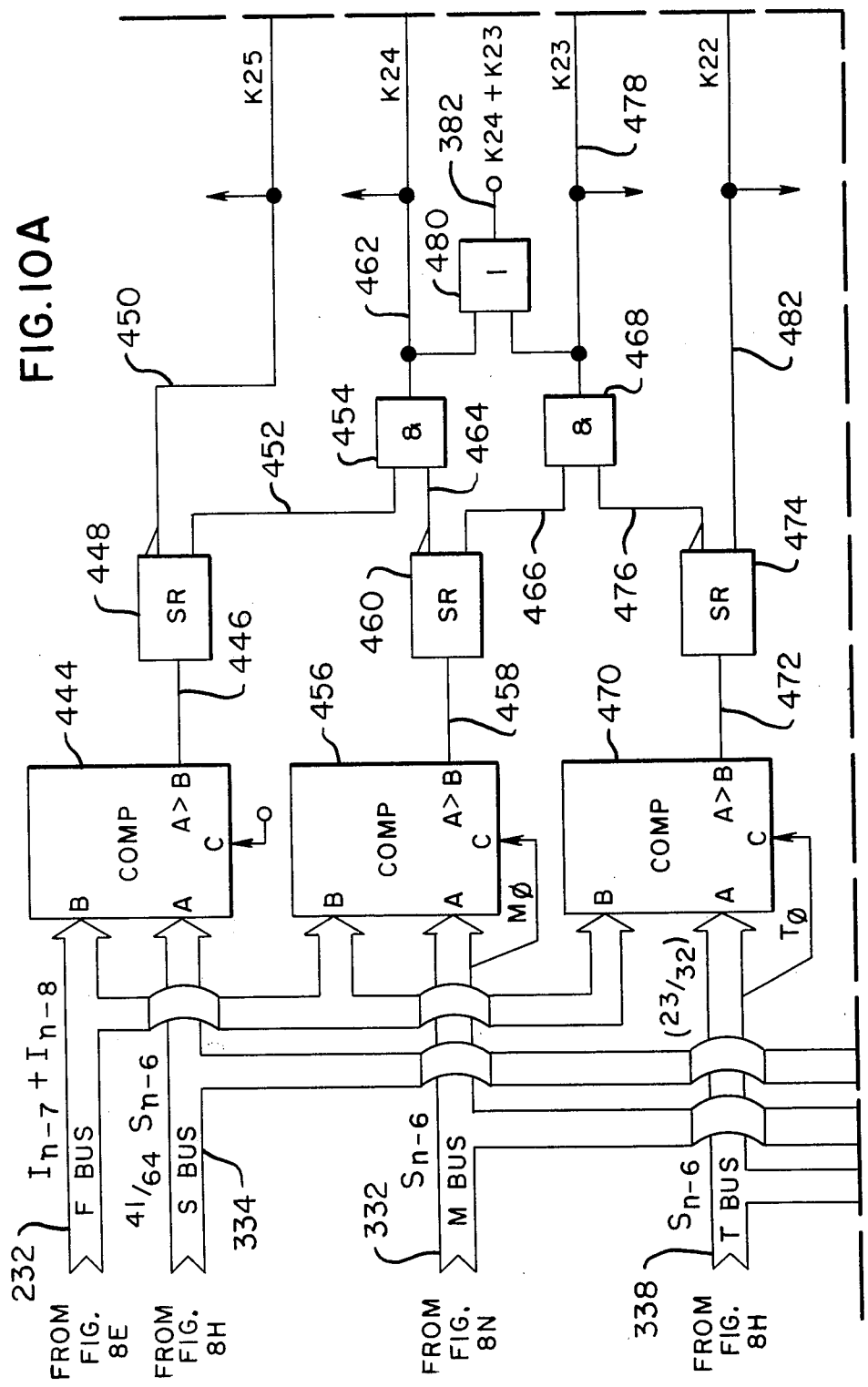

FIG. 16

(1) $\text{MARK} = \text{VID12}$ (2) $\text{AMB71} = I_{n-9} < I_{n-8}$ (3) $\text{AMB82} = I_{n-10} < I_{n-9}$ (4) $\text{AMB17} = I_{n-11} < I_{n-10}$ (5) $\text{AMBE} = \text{VID9}\left[(1\,21/32\, I_{n-9}) > I_{n-10}\right]$
$\qquad + \overline{\text{VID9}}\left[(1\,21/32\, I_{n-10}) > I_{n-9}\right]$ (6) $\text{EQUAL} = \left[(\text{VID15} \oplus \text{VID16})(S_{n-16} > 27/32\, S_{n-12})\right.$
$\qquad \left.(S_{n-12} > 27/32\, S_{n-16})\right] + \left[(\text{VID11} \oplus \text{VID12})\right.$
$\qquad \left.(S_{n-12} > 27/32\, S_{n-8})(S_{n-8} > 27/32\, S_{n-12})\right]$ (7) $\text{INMARG} = \left[\overline{\text{VID13}} \cdot \text{VID12}(S_{n-8} \leq 27/32\, S_{n-12})\right]$
$\qquad \left[5/16\,(I_{n-14} + I_{n-15}) > (I_{n-12} + I_{n-13})\right]$ (8) $S_{n-2} = I_{n-2} + I_{n-3} + I_{n-4} + I_{n-5}$ (9) $\text{OUTMARG} = \left[\overline{\text{VID14}} \cdot \text{VID15}(S_{n-16} \leq 27/32\, S_{n-12})\right]$
$\qquad \left[5/16\,(I_{n-12} + I_{n-13}) > (I_{n-13} + I_{n-14})\right]$

(10) $\text{K25} = (I_{n-9} + I_{n-10}) > 41/64\, S_{n-8}$

(11) $\text{K24} = \left[(I_{n-9} + I_{n-10}) \leq 41/64\, S_{n-8}\right]$
$\qquad \left[(I_{n-9} + I_{n-10}) > 1/2\, S_{n-8}\right]$

(12) $\text{K23} = \left[(I_{n-9} + I_{n-10}) \leq 1/2\, S_{n-8}\right]$
$\qquad \left[(I_{n-9} + I_{n-10}) < 23/64\, S_{n-8}\right]$

FIG. 17

(13) $K22 = \left[(I_{n-9} + I_{n-10}) \leq \frac{23}{64} S_{n-8}\right]$

(14) $K35 = VID8\left[(I_{n-8} + I_{n-9}) > \frac{41}{64} S_{n-8}\right] +$
$\overline{VID8}\left[(I_{n-10} + I_{n-11}) > \frac{41}{64} S_{n-8}\right]$

(15) $K34 = VID8\left[(I_{n-8} + I_{n-9}) \leq \frac{41}{64} S_{n-8}\right]$
$\left[(I_{n-8} + I_{n-9}) > \frac{1}{2} S_{n-8}\right] + \overline{VID8}$
$\left[(I_{n-10} + I_{n-11}) \leq \frac{41}{64} S_{n-8}\right]$
$\left[(I_{n-10} + I_{n-11}) > \frac{1}{2} S_{n-8}\right]$

(16) $K33 = VID8\left[(I_{n-8} + I_{n-9}) \leq \frac{1}{2} S_{n-8}\right]$
$\left[(I_{n-8} + I_{n-9}) > \frac{23}{64} S_{n-8}\right] +$
$\overline{VID8}\left[(I_{n-10} + I_{n-11}) \leq \frac{1}{2} S_{n-8}\right]$
$\left[(I_{n-10} + I_{n-11}) > \frac{23}{64} S_{n-8}\right]$

(17) $K32 = VID8\left[(I_{n-8} + I_{n-9}) \leq \frac{23}{64} S_{n-8}\right] +$
$\overline{VID8}\left[(I_{n-10} + I_{n-11}) \leq \frac{23}{64} S_{n-8}\right]$

(18) NUMBER 0 = K23(K32 + K35)
(19) NUMBER 3 = K25(K32 + K35)
(20) NUMBER 4 = K24(K32 + K35)
(21) NUMBER 5 = K25(K33 + K34)

FIG. 18

(22) NUMBER 6 = K22(K32 + K35)

(23) NUMBER 9 = K22(K33 + K34)

(24) NUMBER 1 = VID8 $\overline{\text{AMB71}}$ K24K33 + AMBE K24K34 + $\overline{\text{VID8}}$ AMB17 K24K33

(25) NUMBER 7 = VID8 AMB71 K24K33 + $\overline{\text{AMBE}}$ K24K34 + $\overline{\text{VID8}}$ $\overline{\text{AMB17}}$ K24K33

(26) NUMBER 2 = VID8 K23K34 AMB82 + $\overline{\text{VID8}}$ K23K34 $\overline{\text{AMB82}}$ + $\overline{\text{VID8}}$ K23K33 AMB82 + VID8 K22K33 $\overline{\text{AMB82}}$

(27) NUMBER 8 = VID8 K23K34 $\overline{\text{AMB82}}$ + $\overline{\text{VID8}}$ K23K34 AMB82 + $\overline{\text{VID8}}$ K22K33 $\overline{\text{AMB82}}$ + VID8 K22K33 AMB82

(28) PARITY = K23(K32 + K34) + K24(K33 + K35) + K25(K32 + K34) + K22(K33 + K34)

(29) CNTRB = (K23 + K24)(K22 + K33)

(30) INCB = $(S_{n-12} \leq {}^{27}/_{32} S_{n-8})$(CNTRB-4)(CNTRB-5)($\overline{\text{VID12} \cdot \text{VID13}}$)($\overline{\text{OUTMARG}}$) $\left[ \overline{(S_{n-12} \leq {}^{27}/_{32} S_{n-8}) + \overline{\text{VID10} \cdot \text{VID11}} \cdot \overline{[{}^{5}/_{16}(I_{n-8} + I_{n-9}) > (I_{n-9} + I_{n-10})]}} \right]$

FIG. 19

(31) $\text{OUTCB} = \big[(\text{CNTRB}-3)(\text{CNTRB}-4)(S_{n-8} \leq {}^{27}/_{32}\, S_{n-12})(\text{VID8}\cdot\overline{\text{VID9}})\big]$
$\overline{[\overline{\text{INMARG}}]\big[\overline{\text{VID17}\cdot \text{VID16}\,(S_{n-12} \leq {}^{27}/_{32}\, S_{n-16})\big[{}^{5}/_{16}(I_{n-18}+I_{n-19})\big] > (I_{n-16}+I_{n-17})}\big][\text{OUTMARG}-7]}$

(32) $\text{PRTY} = \text{PARITY}-4$

(33) $\text{BCD3} = (\text{NUMBER } 8-4) + (\text{NUMBER } 9-4) + \text{ERROR} + \text{INCB} + \text{OUTCB} + \text{INMARG} + \text{OUTMARG}$

(34) $\text{BCD2} = \text{ERROR} + \big\{[(\text{NUMBER } 4-4) + (\text{NUMBER } 5-4) + (\text{NUMBER } 6-4) + (\text{NUMBER } 7-4) + \text{INCB} + \text{OUTCB}]\,[\overline{\text{INMARG}} \cdot \overline{\text{OUTMARG}}]\big\}$

(35) $\text{BCD1}\quad \big\{[(\text{NUMBER } 2-4) + (\text{NUMBER } 3-4) + (\text{NUMBER } 6-4) + (\text{NUMBER } 7-4) + \text{INCB} + \text{OUTMARG} + \text{INMARG}]\,[\overline{\text{OUTCB}}]\big\} + \text{ERROR}$

FIG. 20

$$(36)\ BCD\emptyset = \{[(NUMBER\ 1-4)+(NUMBER\ 3-4)\\
+(NUMBER\ 5-4)+(NUMBER\ 7-4)\\
+(NUMBER\ 9-4)+OUTCB+INMARG]\\
[\overline{INCB}\cdot\overline{OUTMARG}]\}$$

$$(37)\ ERROR = \overline{VIDI2}\ \overline{VIDI3} + VIDI2\ VIDI3$$

SYMBOL DECODING SYSTEM

CROSS-REFERENCE TO RELATED APPLICATIONS

Reference is hereby made to the following copending patent applications, filed on even date herewith and assigned to the NCR Corporation; Symbol Processing System, Ser. No. 043,971, by Blanford et al.; Slot Scanning System, Ser. No. 043,928, by S. Naseem et al.; Topography for I.C. Pattern Recognition Array, Ser. No. 043,929; by Orgill et al. and Topography for I.C. Frame Control Chip, Ser. No. 043,930, by Gardner et al.

BACKGROUND OF THE INVENTION

The present invention relates to a novel method and means for decoding a high density multiple bar code from a record medium at a high rate of speed and more particularly, relates to a NMOS/LSI chip which receives electrical signals generated as the result of scanning a symbol or a label on which is located a multiple bar code such as the Universal Product Code (UPC) and provides signals identifying the unique characters represented by the scanned bar code.

The use of bar coded symbols or labels intended to be read by optical scanning equipment as a means for identifying new data useful in processing items sold in the retail industry has been widely accepted to the point that a particular bar code known as the Universal Product Code (UPC) has been established as the industry standard for the grocery and other related retail industries. In the multiple bar code, such as the UPC, each decimal number or character is represented by two pairs of vertical bars and spaces within a 7-bit pattern wherein a binary 1 bit represents a dark module or bar of a predetermined width and a binary 0 represents a light module or space. Thus, the decimal or character 1 may be represented in the UPC code by the 7-bit pattern 0011001. In keeping with the format, the decimal 1 would be comprised of an initial space of a 2-bit width, followed by a 2-bit wide bar, another 2-bit space and a 1-bit wide bar. For each character or decimal of the system there are two bars and two spaces which have a total width of seven modules or bits. The width of each of the bars or spaces which comprise a character may be 1, 2, 3 or 4 modules wide as long as the sum of the bars and spaces is seven bits or modules wide.

A multiple bar code, such as the UPC, is normally read by an optical scanner which may take the form of a hand-held wand or a scanner mechanism located in a check-out counter. The optical scanner will scan the bar code pattern and generate signals representing the bars and space for transmission to the processing apparatus which determines the character represented by the bar code pattern.

Prior optical readers generally store the electrical signals generated as a result of scanning the bar code pattern until the accumulated signals stored are sufficient to allow the processing apparatus to initiate a recognition operation to determine the character represented by the scanned bar code pattern. Because of the speed in which the scanning operation is performed, the cost of the prior optical readers in processing the electrical signals has been unduly expensive, which in many instances has prevented the readers from reaching the marketplace. It is therefore the principal object of this invention to provide a low-cost optical character reader. It is another object of this invention to provide a low-cost optical character reader system which operates at a relatively high rate of speed without a loss of recognition efficiency. It is the further object of this invention to provide a recognition system embodied in an NMOS/LSI chip.

SUMMARY OF THE INVENTION

In order to carry out these objects, there is provided a high speed optical character reader system which includes a slot scanner mechanism for scanning the bar pattern of a symbol or coded tag which bar pattern includes a plurality of bars and spaces and outputting binary signals representing the time intervals between the edges of bar-to-space and space-to-bar. The binary signals representing the time intervals together with a second binary signal indicating the presence of a bar or space are transmitted to an NMOS/LSI chip which includes a plurality of binary adders, comparators, shift registers and discrete logic elements for decoding in parallel each time interval received to output in parallel a 4-bit binary bit hexadecimal number which may represent a decimal character, the margin or the centerband of the symbol, together with binary bits indicating whether the decimal character represents a bar or space, the direction in which the scanning sequence occurred, and whether the decimal character in the hexadecimal number is a valid or invalid character. Other features and advantages of the present invention will be apparent from the preferred embodiment hereinafter set forth and illustrated in the accompanying drawings.

BRIEF DESCRIPTION OF THE DRAWINGS

FIGS. 8A-8L inclusive taken together disclose the logic circuits for generating signals representing characteristics of each interval scanned by the scanner unit;

FIGS. 10A-10C inclusive taken together disclose the logic circuits for generating signals used in recognizing the character represented by the bar code scanned by the scanner unit;

FIGS. 16-20 inclusive contain equations of the logic terms employed in the present invention.

DESCRIPTION OF THE PRESENT EMBODIMENT

Figure 1:
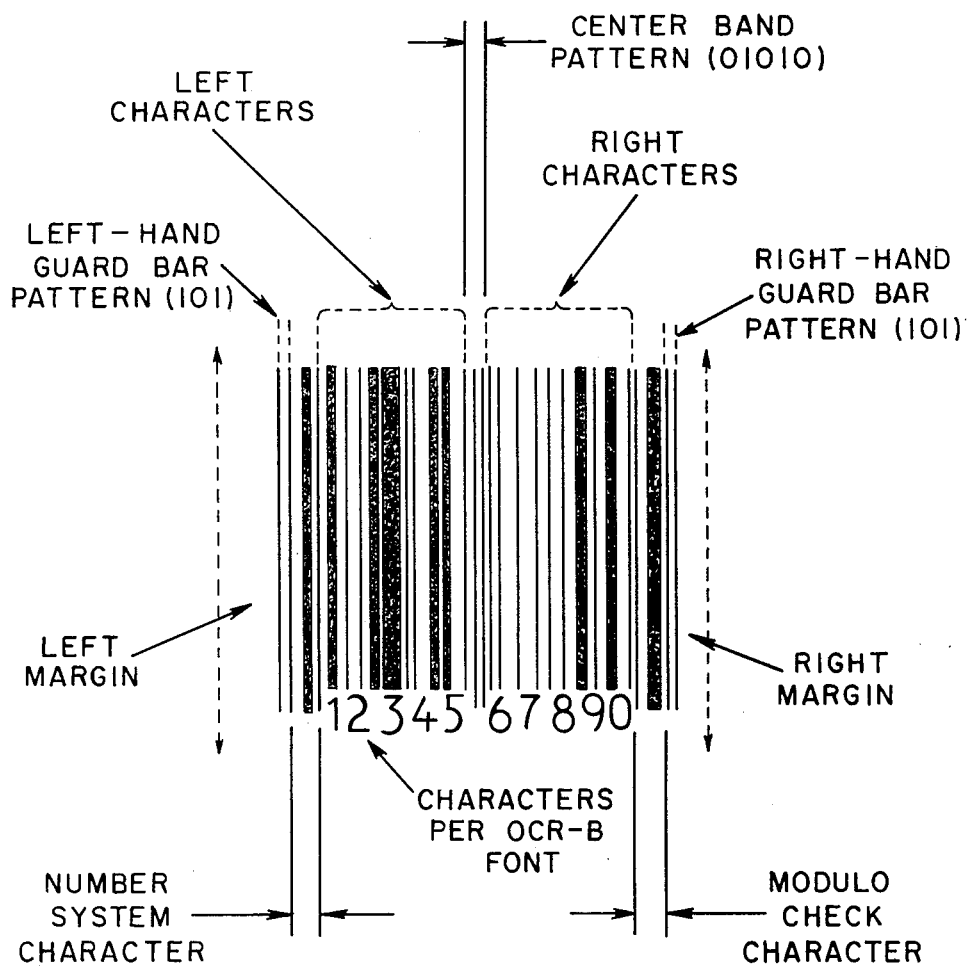
FIG. 1 is a graphical representation of a symbol or coded label such as a UPC coded symbol.

Referring now to FIG. 1, there is shown a graphical representation of a UPC symbol or coded label. The UPC symbol is made up of a series of light and dark parallel bars which comprise twelve characters. Among the twelve characters, two characters are the industry code and a modulo check character and the remaining ten characters are the main code representing data associated with a merchandise item. As shown in FIG. 1, included is a readable number printed in OCR-B font. In addition to the series of light and dark parallel bars, the UPC symbol includes spaces on both sides which are referred to as the left and right margins. Other characteristics of the UPC symbol include the following:

(1) The overall shape of the symbol is rectangular;

(2) Each character of a UPC code is represented by two dark bars and two light spaces;

(3) Each character is comprised of seven equal data elements called modules;

(4) Each module can be light or dark;

(5) Each bar may be composed of 1, 2, 3, or 4 dark modules. Light spaces may also be composed of 1, 2, 3, or 4 modules;

(6) Each character is independent;

(7) The right-most character of the symbol is a modulo check character while the left-most digit of the symbol indicates a system in which this symbol is encoded;

(8) The size of the UPC symbol is variable, that is, it may be large or small without affecting its readability. The UPC symbol may consist of only six characters having the same arrangement as shown in FIG. 1;

(9) The series of light and dark parallel bars are separated from the margins on each side by left and right guard bar patterns and includes a center band pattern located at the center of the UPC symbol.

Figures 2, 3:
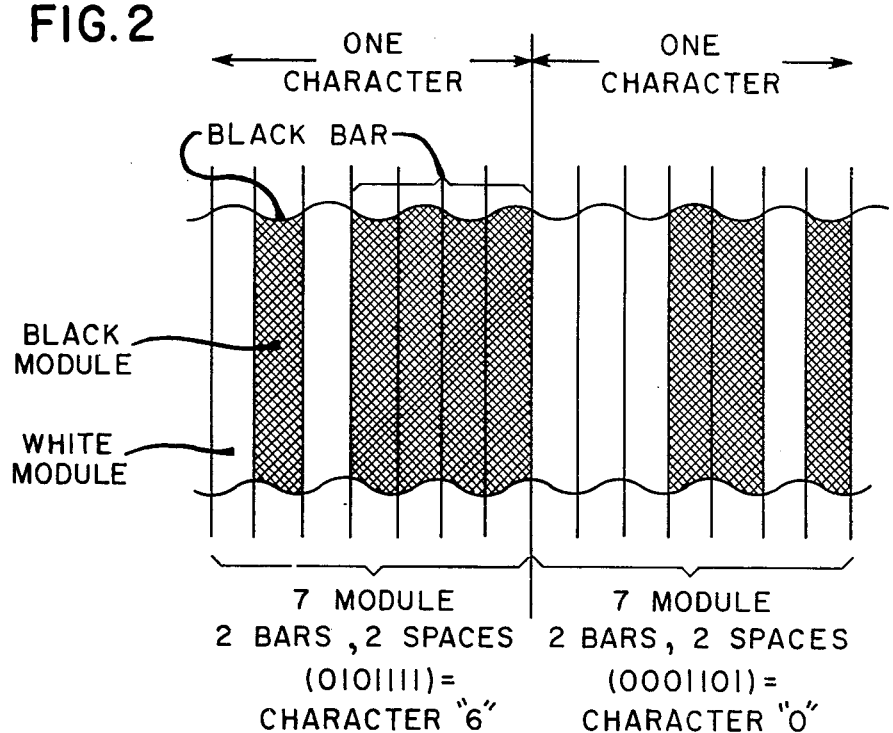
FIG. 2 is a graphical representation of the character structure of the UPC symbol.
FIG. 3 is a table showing the code structure of the UPC symbol character.

Referring now to FIG. 2, there is shown a graphical representation of the character structure of the UPC symbol. As shown, each encoded UPC character is made up of two dark bars and two light spaces each composed of a differing number of modules. By assigning a 1 which corresponds to the black module and a 0 to a white module, the lefthand character represents (0101111) which denotes the character 6 and the right hand character represents (0001101) which denotes the character 0. The structure of the character code is not uniquely determined by each character, but is different according to which side of the center band pattern the character is located on. It is thus arranged that the light modules and the black modules are reversed as the character is located on the right or left sides, and as a result an odd number of black modules is included in each character code on the left hand side and an even number of black modules is included in each character code on the right hand side as indicated in FIG. 3. This parity relation provides information for determining the read-out direction of the codes. With this arrangement, the left-hand characters always start with light bars and the right-hand characters always start with dark bars (reading left to right). The whole structure of the character codes is as shown in the Table in FIG. 3. It should be noted that the number of dark modules in the left side digit is always 3 or 5 while the number is always 2 or 4 for the right hand digit. These characteristics are used as a parity check. The left side digits have odd parity while the right side digits have even parity.

Figure 4A:
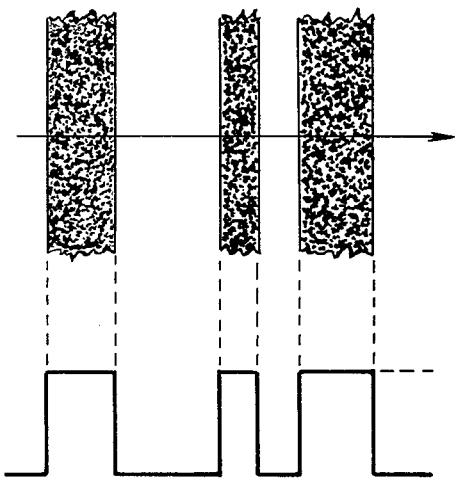
FIGS. 4A and 4B are graphical representations of the bar pattern and the transformed binary symmetrical signal.
Figure 4B:
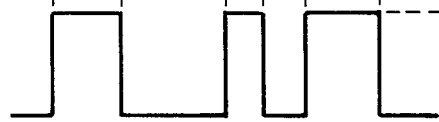

After a character is scanned, each module is assigned a binary value. Thus, as shown in FIGS. 4A and 4B, scanning of the modules in the direction as noted, a binary 1 signal is generated upon the sensing of a black bar, while a binary 0 signal is generated upon the sensing of a light bar or space. Because of problems in printing, it is uncommon for the width of the light bar and the black bar to be of the ideal value. Therefore, in decoding the UPC symbol, this condition must be taken into consideration.

In addition, the tolerances for a UPC symbol or tag are larger for the space that starts or ends a character. Because of the print condition of the bar and space alluded to above, it has been found that the dimension tolerances between similar edges are better than between dissimilar edges, that is, measuring the distance between trailing edges of adjacent bars and spaces or measuring the distance between the leading edges of adjacent bars and spaces produces data which gives high recognition efficiency to the system.

Figure 5:
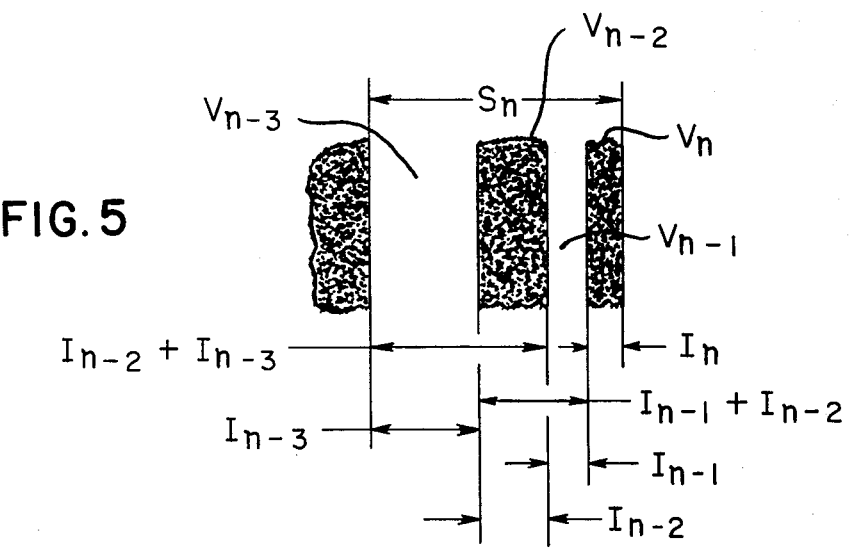
FIG. 5 is a graphical representation of a bar code illustrating the dimensional relationships utilized in the present recognition system.

Referring now to FIG. 5, there is illustrated the present method for recognizing the characters represented by the pattern of the UPC bar code as shown in FIG. 1. As previously described, each character comprises two dark bars and two white bars or spaces. Representing each bar and space as an interval, it will be seen that each character is composed of four intervals, where each interval is composed of the same background, either dark or white. To represent the most recent interval that has been sensed by the scanner, the designation $I_N$ is used with the designation $V_N$ representing the bar for that interval. The designation $I_N$ is an 11 bit binary number generated in a manner to be described hereinafter. To designate the interval preceding the current interval, the notation $I_{N-1}$ and $V_{N-1}$ is used. For the interval before that, the notation $I_{N-2}$ and $V_{N-2}$ is used and so on. The sum of the four consecutive intervals scanned by the scanner is shown in FIG. 5 by the notation $S_N$ where $S_N$ equals $I_N$ plus $I_{N-1}$ plus $I_{N-2}$ and $I_{N-3}$. For each interval scanned, the system examines the three preceding scanned intervals together with the current scanned interval and assigns a hexadecimal value. Each interval that is scanned is then classified as a bar (binary 1) or a space (binary 0). If $V_N$ is a binary 1 (bar), then $I_N+I_{N-1}$ and $I_{N-1}+I_{N-2}$ are compared to one half $S_N$, 23/64 $S_N$ and 41/64 $S_N$. From this comparison two sets of weights can be found. Each of these weights will be either 2, 3, 4 or 5. From these weights the system will determine if a character is odd or even parity. Further utilizing these weights, the system will establish the characters 0, 3, 4, 5, 6, and 9. However, two sets of ambiguous characters are found. The characters 1 and 7 are ambiguous, that is, both have the same apparent configuration, and also the characters 2 and 8. To distinguish between the characters 2 and 8 requires finding if the interval $I_{N-1}$ of each character is greater than the interval $I_{N-2}$. If it is greater, the character is 2. Odd parity 1 and 7 can be separated by determining if intervals $I_N$ is greater than the interval $I_{N-1}$. If in this case it is greater, the character is a 1. Even parity 1 and 7 requires that the term 21/32 $I_{N-2}$ is greater than $I_{N-1}$. In this latter case, if the term is greater, the character is a 1. In all of these cases, the single intervals were all used to determine the ambiguous characters.

Upon the scanning of each interval, the system will sum the three previous intervals together with the current scanned interval and then compare the sum of those four intervals $S_N$ (FIG. 5) with the previous sum $S_N$ generated to determine if they are equal within a predetermined limit. Thus, a signal EQUAL indicating equality will be generated if 27/32 $S_N$ is less than $S_{N-4}$ and $S_N$ is greater than 27/32 $S_{N-4}$ and no error is detected. An error condition exists where the width of an interval exceeds the predetermined count.

Referring to FIG. 1, it will be seen that the bar code symbol has left and right margins and the center band portion of the code. When scanning from left to right as viewed in FIG. 1, the left margin will be characterized as the in margin while the right margin will be characterized as the out margin. Similarly, the left portion of the center band will be characterized as the in center band and the right binary bits generated for use in recognizing the character contained in the hexadecimal number being outputted at that time. As pointed out previously, each interval scanned will result in the outputting of a hexadecimal number which contains four binary-coded decimal (BCD) bits with only a portion of the hexadecimal numbers outputted being valid.

Figure 6:
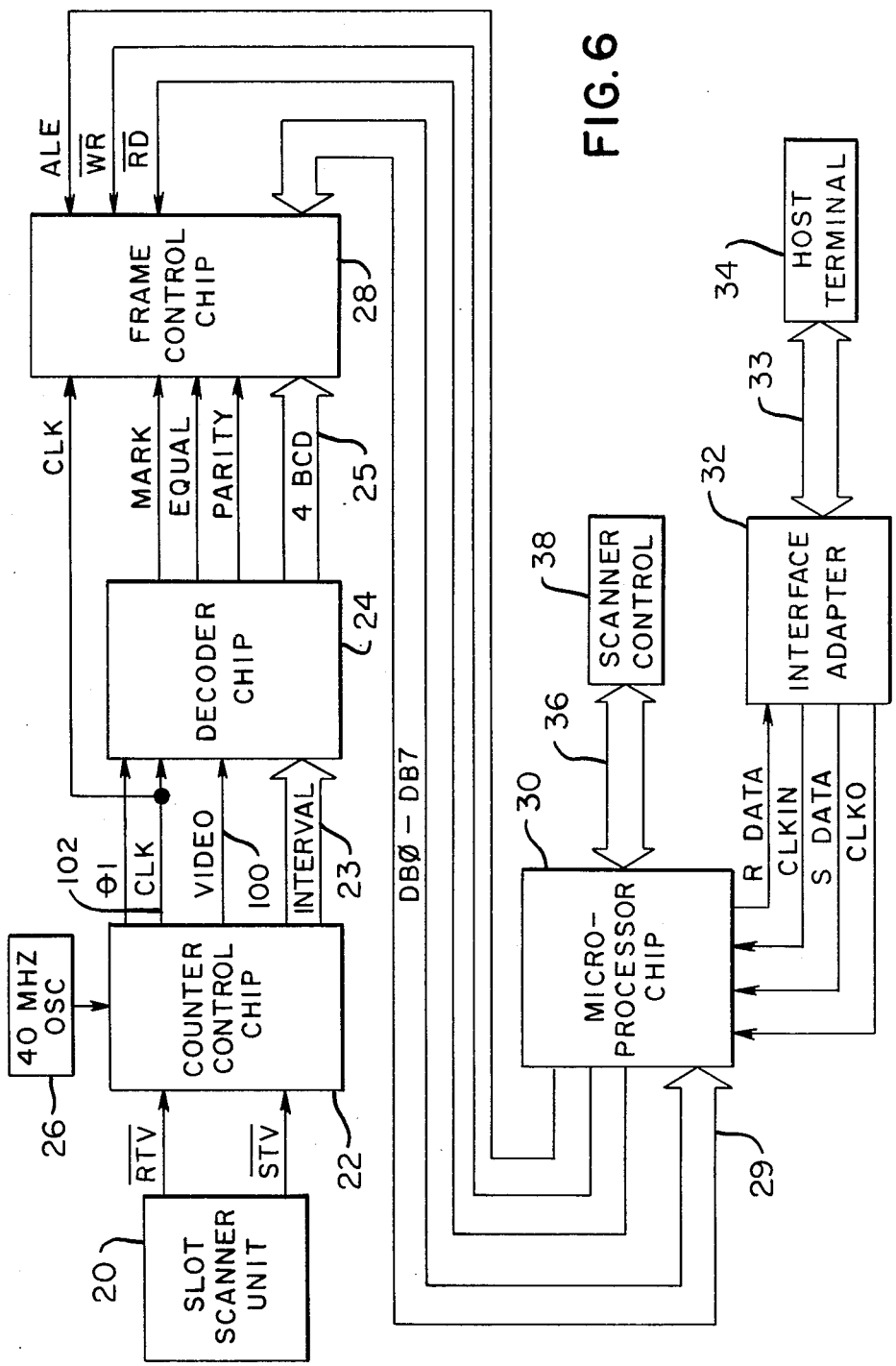
FIG. 6 is a block diagram of the various arrays which comprise the pattern recognition and scanning system.

Referring now to FIG. 6 there is shown a block diagram of the character recognition system in which the present embodiment is utilized including a slot scanner 20 which causes a laser beam to be reflected to produce a scanned portion above and in front of a slot or opening adjacent the laser. If a UPC symbol or tag is placed such that the laser beam crosses the tag thereby reflecting the light from the bars and spaces which compose the UPC tag, a photodetector receiving the reflected light will transform the reflected light into an electrical signal. A video amplifier (not shown) located in the scanning unit generates, in response to the generated electrical signals, digital pulses $\overline{STV}$ (Set Video) indicating a space-to-bar transition and $\overline{RTV}$ (Reset Video) indicating a bar-to-space transition. The time interval between these pulses is a function of the width of the bar or space. The pulse width of the signals $\overline{STV}$ and $\overline{RTV}$ can be from 25 ns. to 2 us sec. Valid signals alternate are never closer together than 350 ns. This means that following a valid $\overline{STV}$ or $\overline{RTV}$, multiple pulses may occur during this 350 ms. time period.

These time intervals are transmitted to a counter control chip 22 (FIG. 6) in which the intervals are converted to a binary number by an interval counter and then transmitted to a FIFO (First-In, First-Out) IC array. The FIFO time averages the time between intervals to an acceptable period. Either of the signals $\overline{STV}$ and $\overline{RTV}$ will stop the interval counter and cause that interval count along with the state of a VIDEO flip-flop (not shown) to be stored in a FIFO shift register (not shown). The VIDEO flip-flop will be true for a bar. The interval counter at this point is reset and the next interval count is started. If the output of the interval counter is greater than 1280 counts (32 us.), an overflow condition is created. In the overflow state, every 800 ns. of the count of 1280 and the last state of the VIDEO flip-flop will be loaded into the FIFO shift register. The occurrence of the next $\overline{STV}$ or $\overline{RTV}$ signal will result in the loading of an additional 1280 count into the FIFO shift register. This condition will cause an error signal to be generated which, as will be described more fully hereinafter, will be sensed by the system at this time. Using this error signal, the system will disregard the data that is being generated by the slot scanner unit 20 and the counter control chip 22. The data contained in the FIFO shift register located in the counter control chip 22 will be outputted to a decoder chip 24 which is the subject of the present application under the control of clock pulses generated by a 40 Mhz. oscillator 26. The FIFO shift register will output 11 bits of binary data representing the width of the interval being scanned over bus 23 (FIG. 6) together with a VIDEO signal indicating whether the interval is a bar or a space. Also outputted from the counter control chip 22 to the decoder chip 24 are clock pulses CLK. For a more detailed disclosure of the counter control unit 22, reference should be made to the previously cited co-pending application of Naseem et al., Ser. No. 043,928.

The decoder chip 24 (FIG. 6) contains a number of binary adders, comparators, shift registers and discrete logic elements which are used to decode the data being scanned by the slot scanner unit 20. The decoder chip 24 will output a hexadecimal number which includes four BCD bits representing a decimal character in addition to indicating margins, center bands and error. Three additional binary bits are outputted by the decoder chip 24 which represent the signal MARK to indicate the interval is a bar or a space, the signal EQUAL indicating that the current interval taken together with the three previous intervals are either equal or not equal in width to the previous four intervals and the signal PARITY indicating that the interval is odd parity if true or even parity if false, thereby locating the interval on the left or right side of the center band.

The output signals from the decoder chip 24 are transmitted to a frame control chip 28 (FIG. 6) which separates the valid data from the invalid data being outputted by the decoder chip 24. The frame control chip 28 filters out this valid data by checking for framing characters, that is, in and out margins, in and out center bands, and character equality to identify the valid characters being decoded by the decoder chip 24. A good segment of valid data is then transmitted over bus 29 to a microprocessor chip 30 for further processing. The frame control chip 28 functions also as a communication adapter for transmitting data to be sent from the microprocessor through an interface adapter 32 to a host terminal 34 over bus 33. The microprocessor chip 30 monitors photodetectors in the slot scanner unit 20 to determine when an item is in position to be read by the slot scanner. This data is transmitted to the microprocessor chip 30 over a bus 36 coupled to a scanner control unit 38. Upon receiving the required control signals, the microprocessor will then start monitoring the frame control chip 28 for information. The microprocessor does correlation analysis and modulo ten check to determine if it has a valid tag. Once a valid tag is assembled, the data is transmitted to the host terminal through the interface adapter 32. Reference should be made to the previously cited co-pending applications of Blanford et al. Ser. No. 043,971 and Gardner et al., Ser. No. 043,930 for a full disclosure of control chip 28, Orgill et al., Ser. No. 043,929 for a full disclosure of the decoder chip 24 and Naseem et al., Ser. No. 043,928 for a full disclosure of the microprocessor chip 30, each assigned to the present assignee of the application, which disclosures are fully incorporated into this application by reference.

Figure 7:
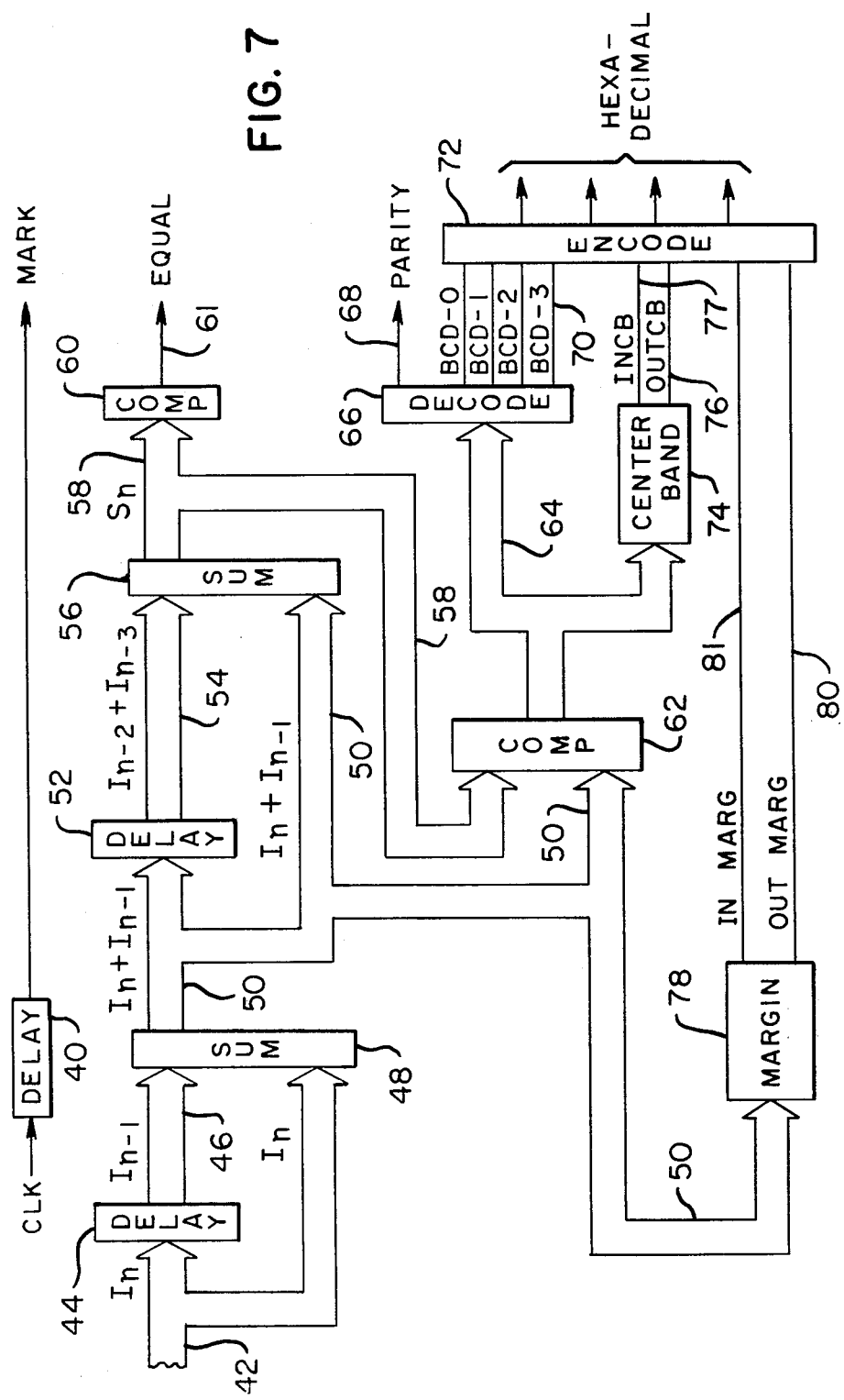
FIG. 7 is a block diagram of one embodiment of the present invention wherein a recognition chip receives the output signals of the scanner and generates decoded data representing the bar code scanned.

Referring now to FIG. 7, there is shown a block diagram of the logic circuits employed in the present embodiment for generating binary signals representing the terms mark, equal, parity and a hexadecimal number which may represent the interval as one of, or a part of a 9 decimal character, the in center band, the out center band, the in margin or the out margin. As previously described, the counter control chip 22 (FIG. 6) will continually output binary data representing the width of the interval being scanned by the slot scanner unit 20 (FIG. 6). This binary data is in the form of an 11 bit wide binary word which is transmitted over bus 23 (FIG. 6) to the decoder chip 24. Also outputted at this time is a clock pulse CLK which, as shown in FIG. 7, is transmitted through a delay circuit 40 which delays the clock pulse a predetermined number of clock times so that the output pulse from the delay circuit 40 will correspond to the output of the logic circuits shown in FIG. 7 as a result of processing the interval which was generated with the clock pulse in the counter control chip 22. The delayed clock pulse designated MARK identifies whether the interval processed by the logic circuits was a space (binary 0) or a bar (binary 1). In the present embodiment, the delay is 12 clock pulses.

As will be described more fully hereinafter, the interval being outputted by the counter control unit 22 (FIG. 6) is transmitted to a latch member 104 (FIG. 8A) whose output will appear on bus 42 (FIG. 7). The current interval segment designated $I_N$ is transmitted over the 11 bit wide bus 42 to a delay circuit 44 on whose output at this time will appear the previous interval $I_{N-1}$. This latter term is transmitted over bus 46 to the summing circuit 48 which adds the current interval $I_N$ with the previous interval $I_{N-1}$ to output over bus 50 the sum of the two consecutive intervals $I_N+I_{N-1}$. This latter term is transmitted to a two clock pulse delay circuit 52 on whose output appears the sum of the third and fourth previous intervals $I_{N-2}+I_{N-3}$ which term is transmitted over bus 54 to a summing circuit 56 to be added with the term $I_N+I_{N-1}$, the summing circuit 56 outputting over bus 58 the term $S_N$ which is the sum of the last four intervals scanned by the scanning unit 20 (FIG. 6). The sum $S_N$ is then compared in the comparator circuit 60 with the sum $S_N$ of the previous four intervals to determine if they are equal. If they are, the character being outputted at this time by the logic circuit is valid. If not, the character is not valid. Since the logic circuits of FIG. 7 will output a character upon receiving the 11 binary bits of data representing the width of each interval, the binary bit representing the signal EQUAL and appearing on the output line 61 of the comparator circuit 60 designates whether the character is valid (binary 1) or invalid (binary 0).

The sum of the two intevals $I_N+I_{N-1}$ being outputted over bus 50 by the summing circuit 48 is also transmitted to a comparator circuit 62 which also receives over bus 58 the sum $S_N$ of the last four intervals to output over bus 64 data which is transmitted to a decoder circuit 66 which decodes the input data to generate over line 68 a bit indicating odd or even parity. The decoder circuit 66 will also output over line 70 four BCD bits which are transmitted to an encoder circuit 72 which outputs a hexadecimal number which may represent one of the decimal characters 0–9 based upon the data transmitted to the encoder circuit 72 from the decoder circuit 66. The output data from the comparator circuit 62 is also transmitted over the bus 64 to a center band logic circuit 74 which will output over lines 76, 77 binary bits indicating whether the interval corresponds to the in center band or the out center band which binary bits are transmitted to the encoder circuit 72 for inclusion in the hexadecimal number output. The sum of the two previous intervals $I_N+I_{N-1}$ is also transmitted over bus 50 to a margin logic circuit 78 which will output over lines 80, 81 binary bits designating the interval as part of the in margin or the out margin, which binary bits are transmitted to the encoder logic circuit 72 for inclusion in the hexadecimal number being outputted from the encoder circuit. Thus, the logic circuitry of the decoder chip 24 (FIG. 6) receives binary data bits representing the width of the intervals scanned plus a bit indicating a bar or space from the counter control chip 22 and decodes the data to output hexidecimal numbers which represent a decimal character, together with other characteristics of the interval for use by the system in recognizing the characters represented by the bar code scanned by the slot scanner unit 20.

Figure 8B:
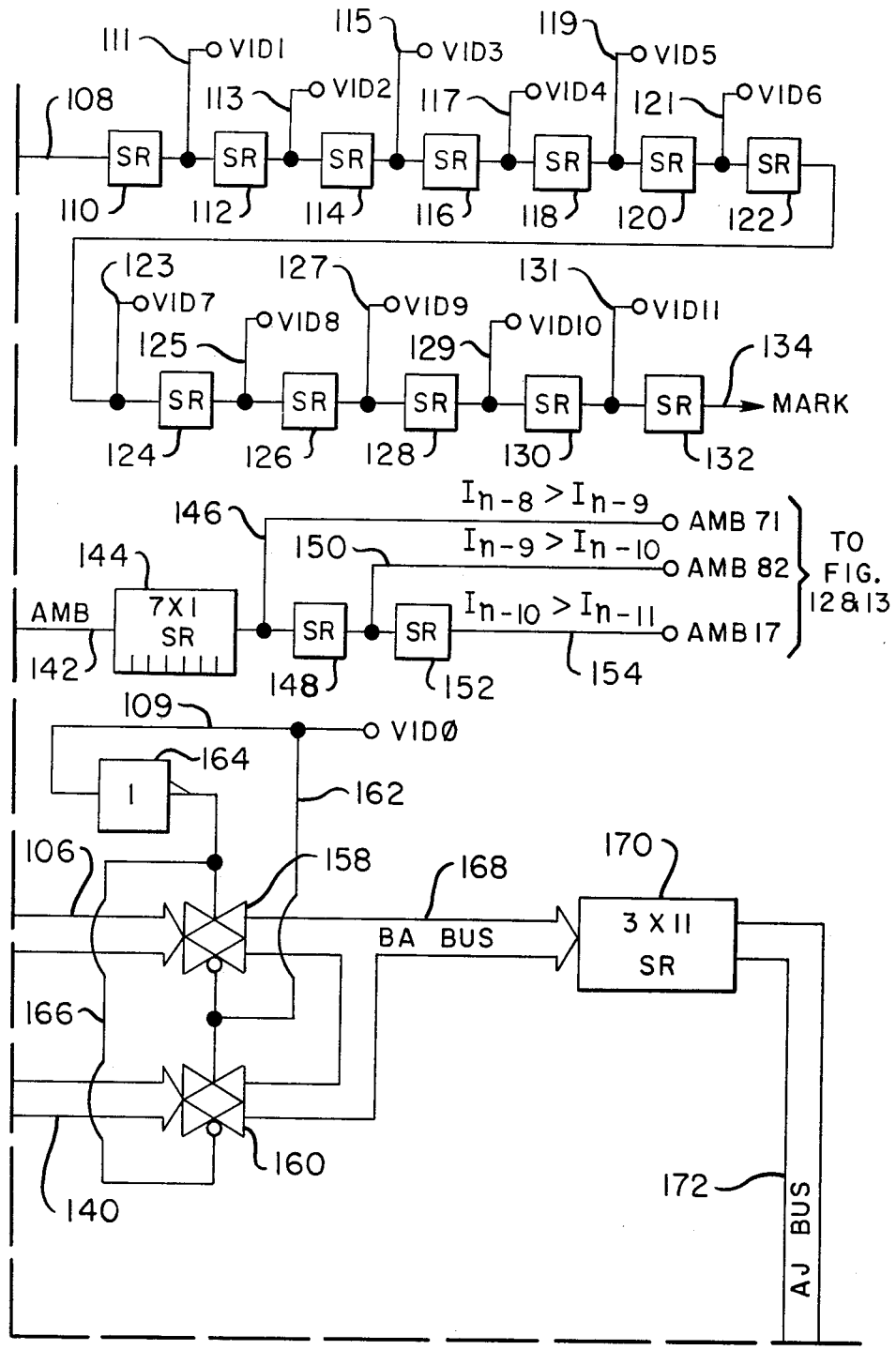
Figure 8C:
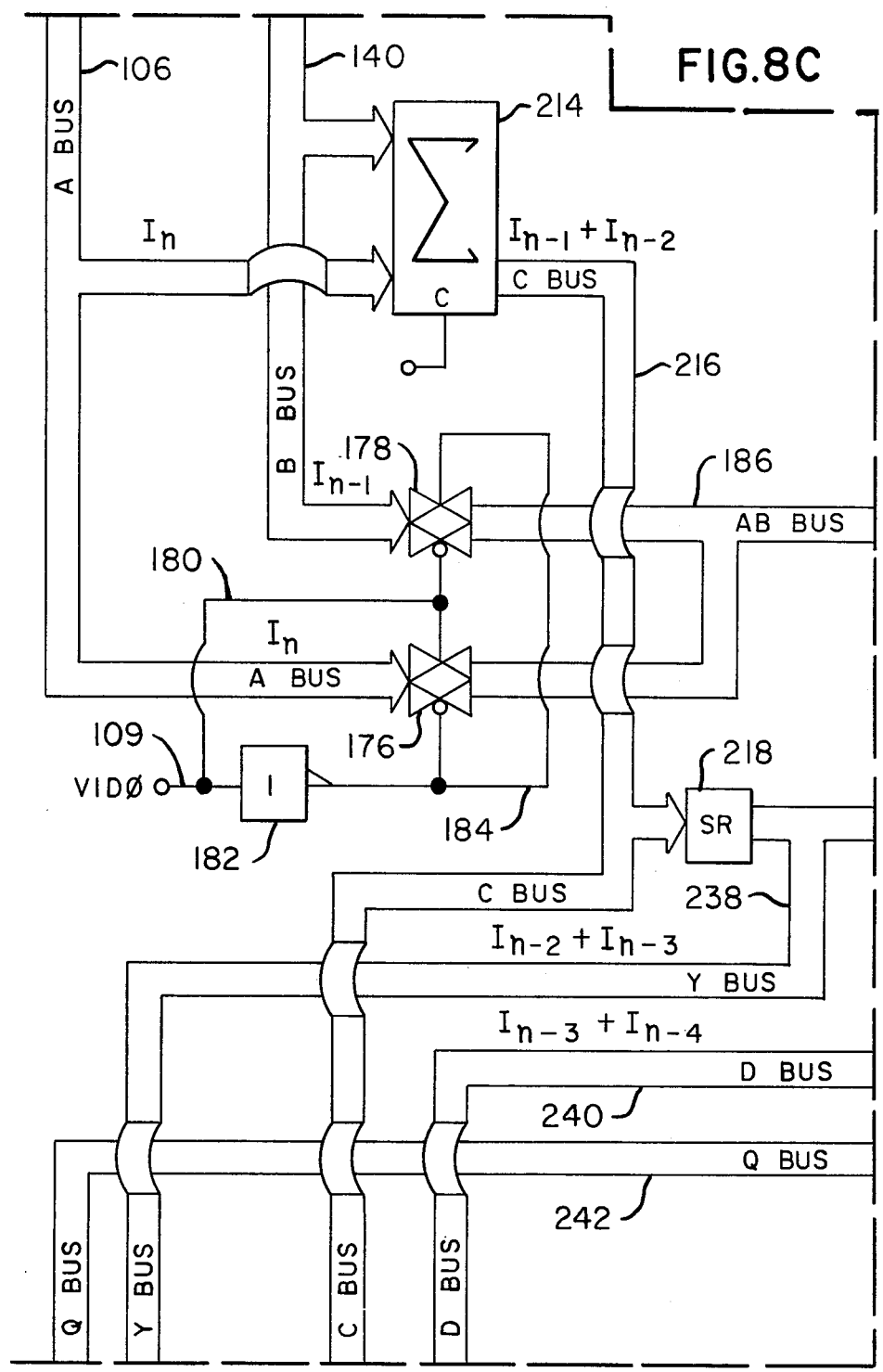
Figure 8D:
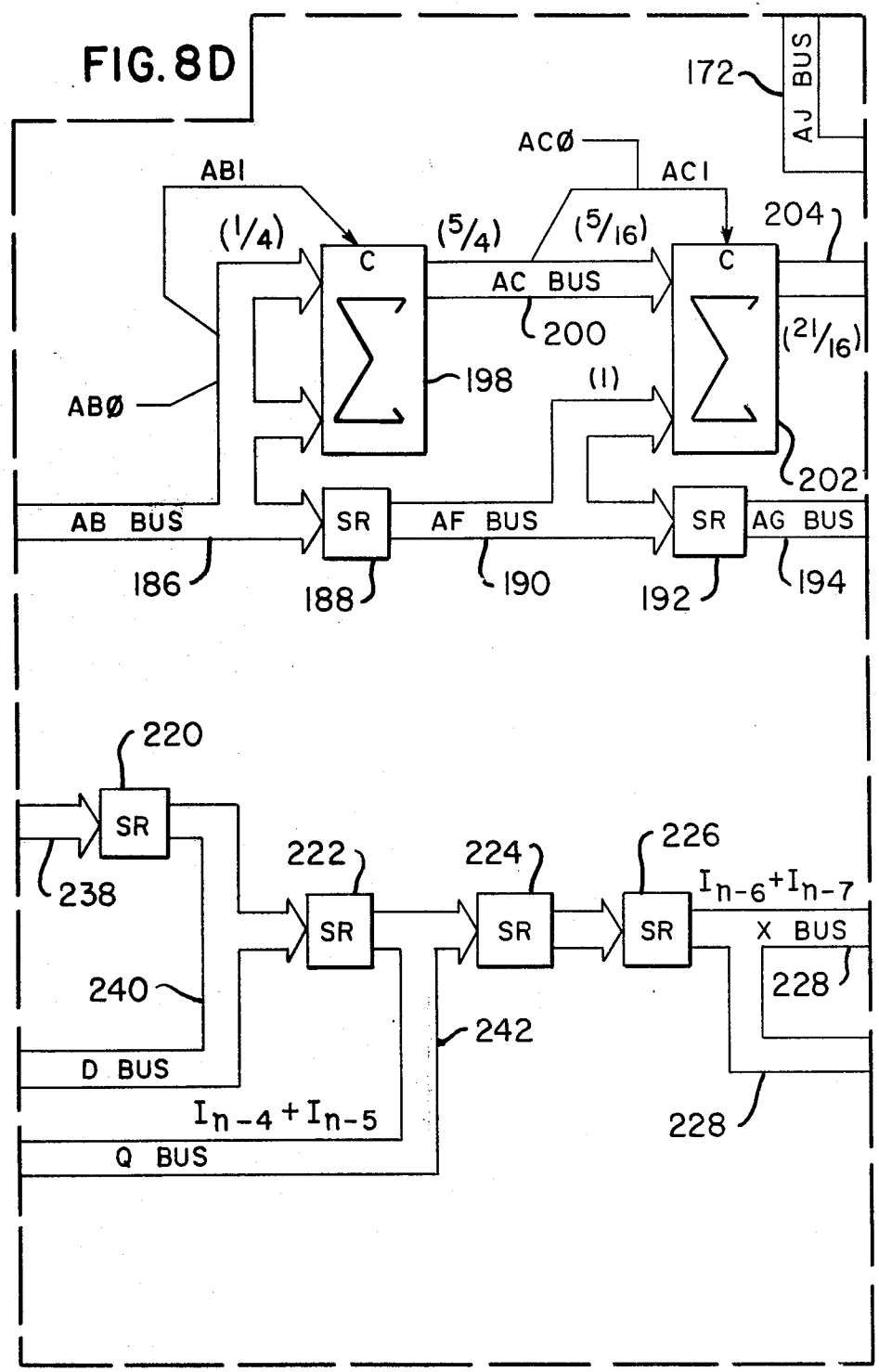
Figure 8E:
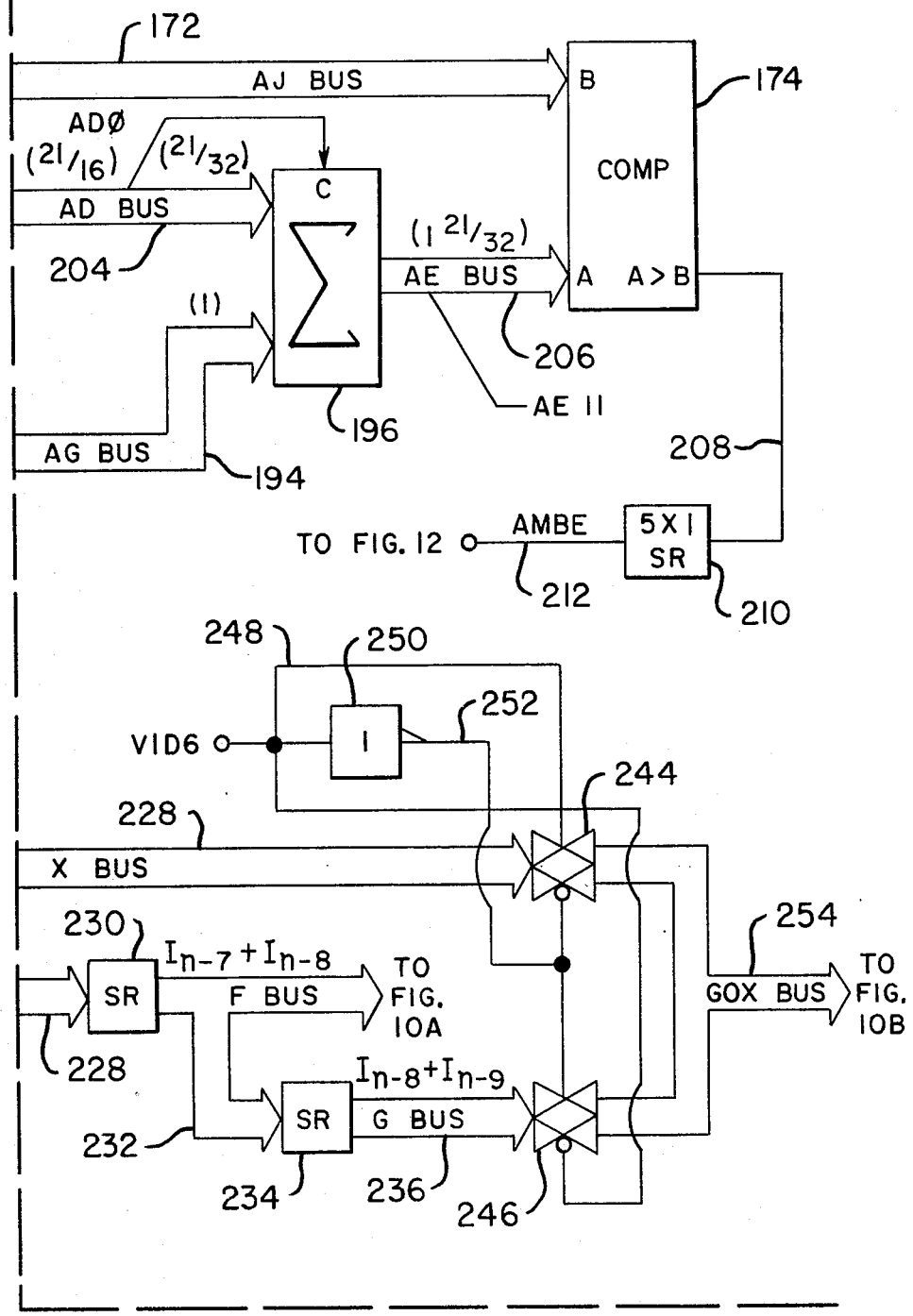
Figure 8F:
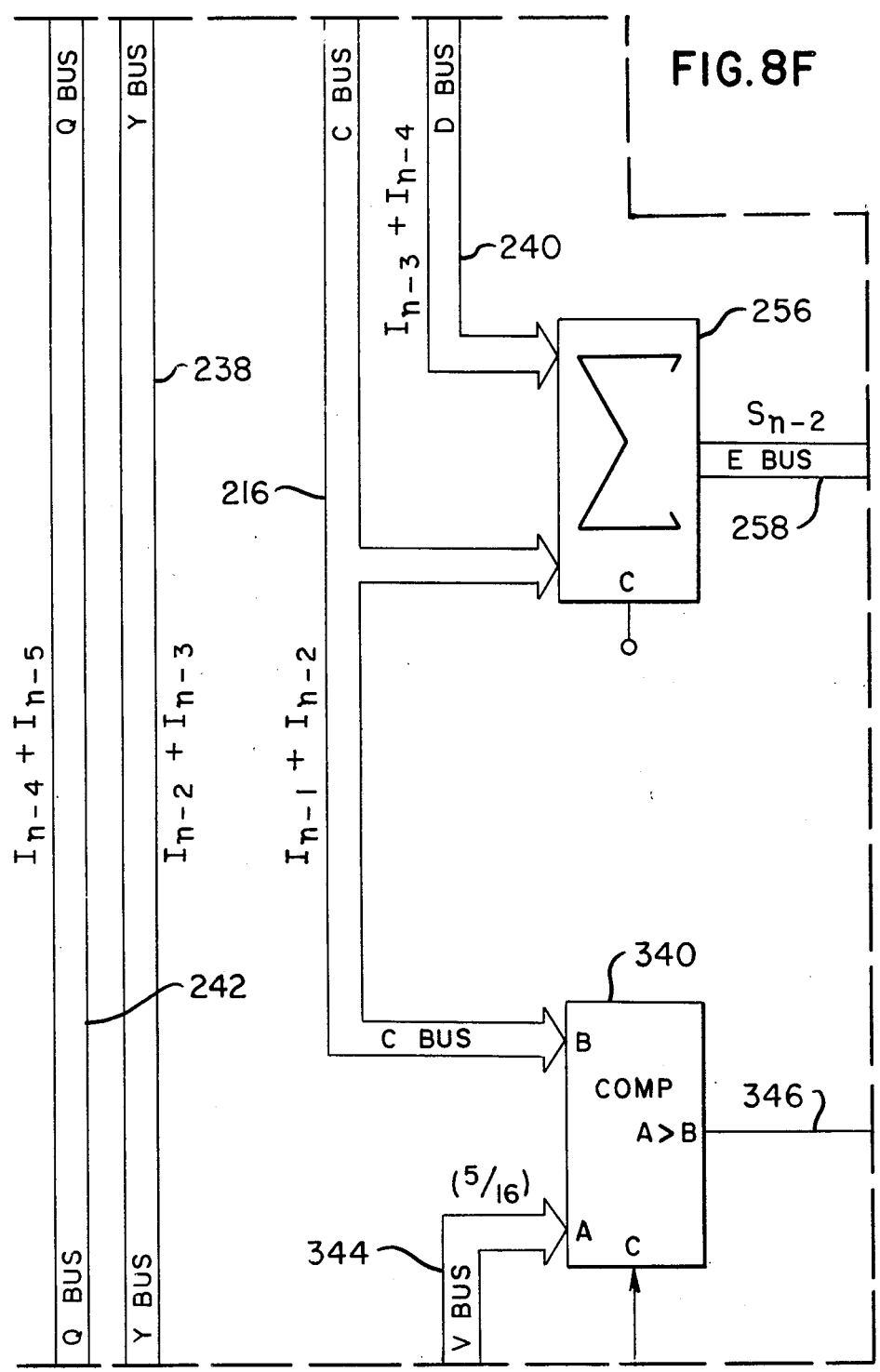
Figure 8G:
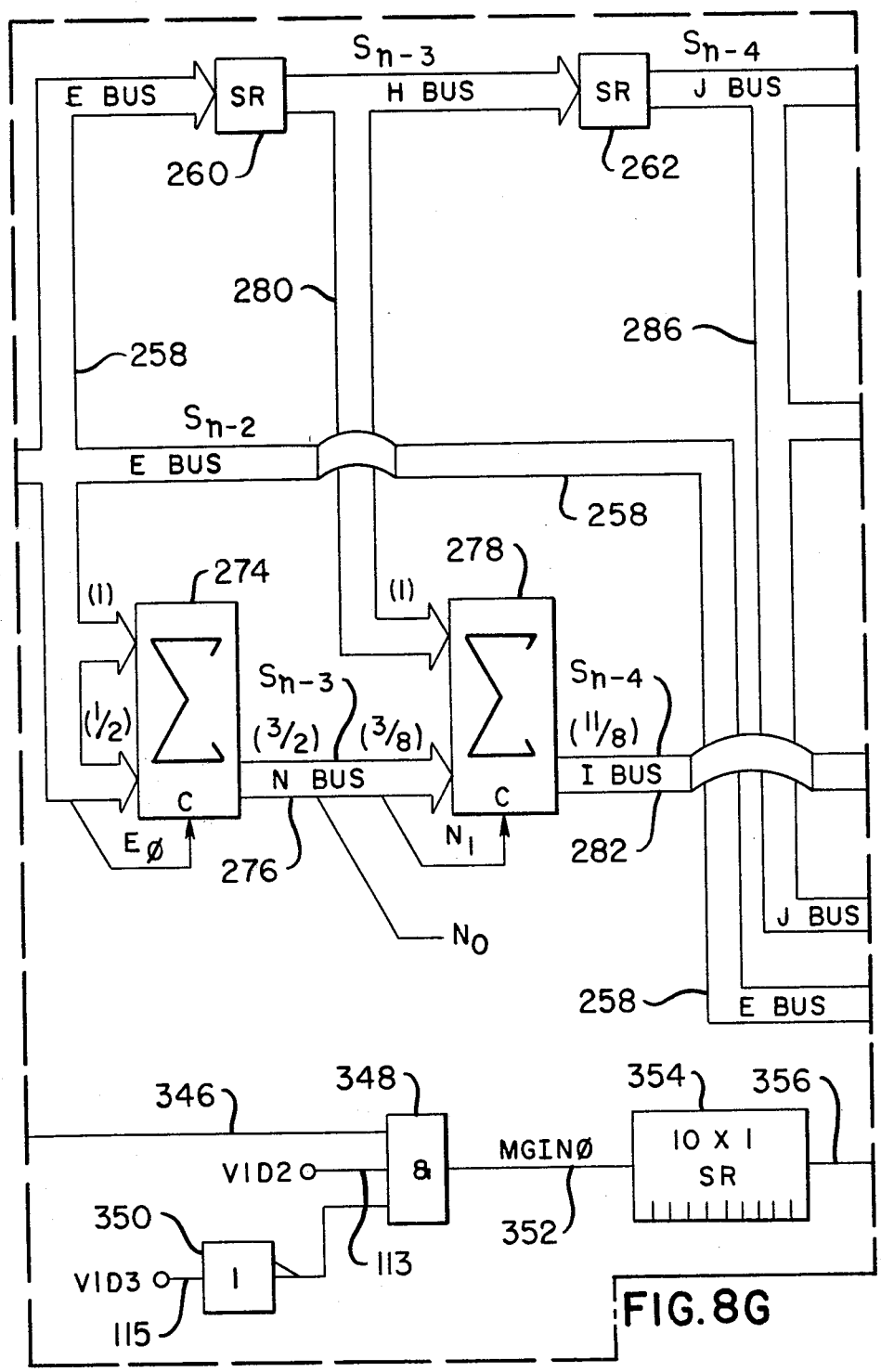
Figure 8I:
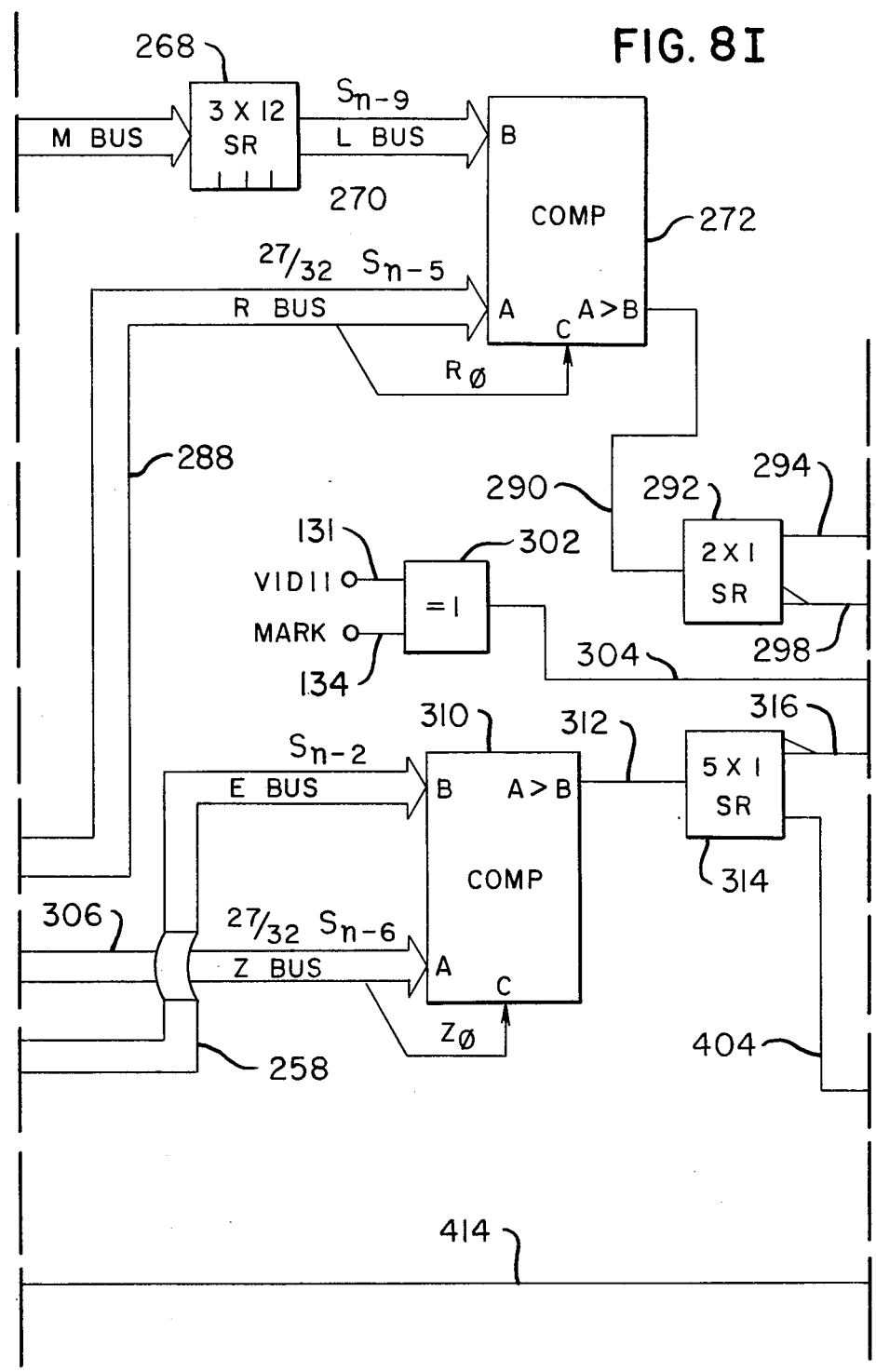
Figure 8J:
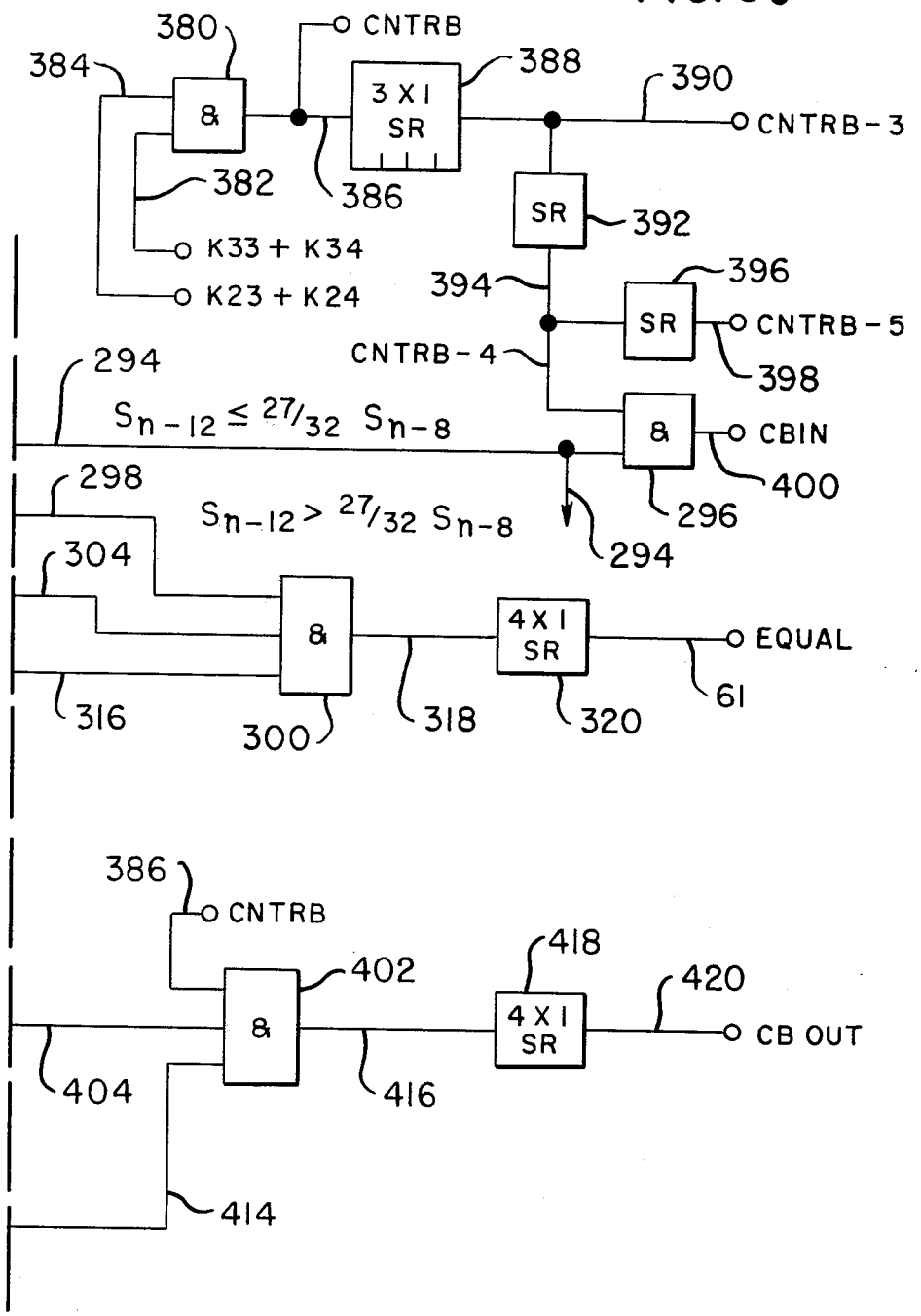
Figure 8K:
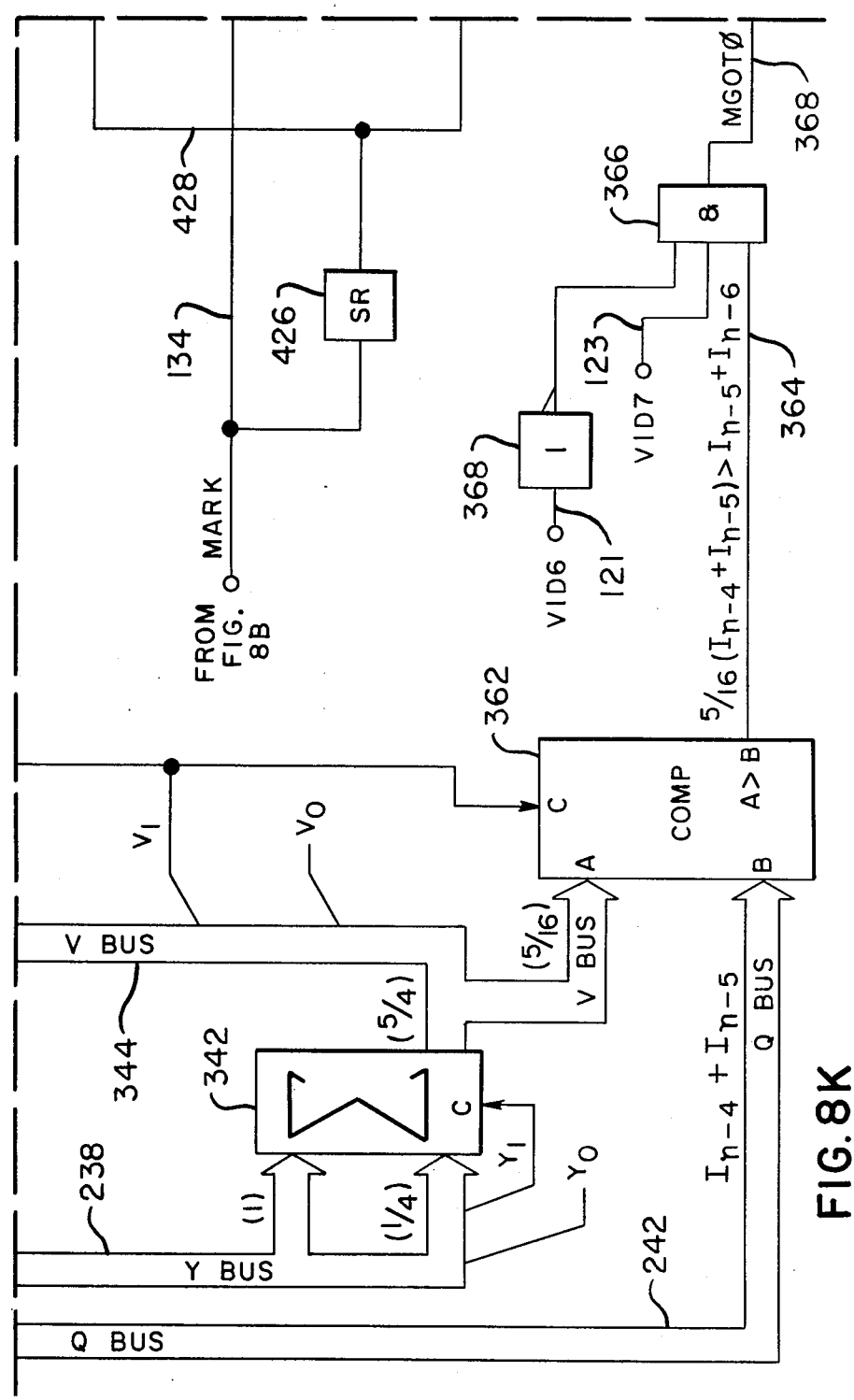
Figure 9:
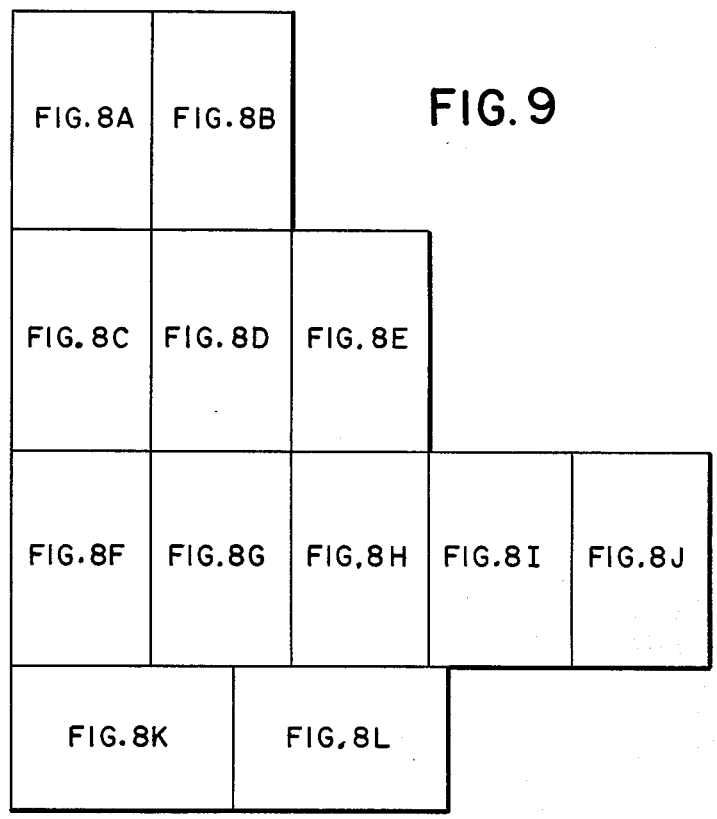
FIG. 9 is a diagram showing the manner in which FIGS. 8A-8L inclusive are arranged with respect to each other to form the logic circuits.

Referring now to FIGS. 8A–8L inclusive, arranged in the manner as shown in FIG. 9, there is disclosed logic circuits for generating signals representing characteristics of the intervals being scanned by the slot scanner unit 20 (FIG. 6). Each interval received over bus 23 by the decoder chip 24 is combined with the three previous intervals scanned and then decoded into a 4-bit binary character. The width of each combined four intervals is compared with the previous four intervals to determine character equality. The characters are equal if the character lengths are within eighty-five percent of each other. Each interval is processed to determine if it is a part of a margin or part of a center band pattern. In addition, the parity of the interval is determined. In addition, the logic circuits checked for error conditions. Each of these operations are carried out asynchronously in a manner that will now be described.

In the following discussion of the present embodiment, reference will be made to the logic equations shown in FIGS. 16–20 inclusive, which equations cover the logic circuits to be described. Referring now to FIG. 8A, there is shown in block form a portion of the counter control unit 22 (FIG. 6) which includes high-speed logic 88 receiving the 40 Mhz. clock pulse from the oscillator 26 (FIG. 6) and the video signals $\overline{RTV}$ and $\overline{STV}$, each representing the edge of an interval scanned. The logic 88 will output over bus 90 a 12 bit binary word representing the interval count, which in the present embodiment has a minimum value of 350 nanoseconds. Because of the high speed with which the system operates, the logic 88 includes a Johnson counter (not shown) which is preset to a predetermined time interval and is operated to count the width of the interval after allowing the previous interval count to be outputted into the decoder chip 24 (FIG. 6). The logic 88 will output a 12 bit word which includes an 11 bit binary word over bus 90 (FIG. 8A) representing the interval count, a VIDEO bit over line 92 which is high if the interval is a bar and low if it is a space. The logic 88 also outputs a clock pulse over line 94 which clocks the binary word through a FIFO storage unit 96 which in turn outputs in sequential order the 11 bit interval count over bus 23, the VIDEO signal over line 100 and the clock pulse over line 102 to a latch member 104 located in the decoder chip 24 (FIG. 6). The latch 104 will output over line 108 the video signal at a clock pulse of 350 nanoseconds, the pulse being designated VID0. The video clock pulse VID0 is transmitted over line 108 to a plurality of shift registers 110-122 inclusive (FIG. 8B) which are arranged in series. Each shift register will produce a one clock pulse delay whose output pulses are designated VID1-VID11 inclusive and which are used to clock the intervals through the logic circuits in a manner that will now be described. The output clock pulse from the shift register 132 is designated as the signal MARK which is used to identify the binary character outputted by the decoder chip 24 upon receiving each 11 bit binary word representing the interval count from the FIFO 96. Reference should be made to the previously cited co-pending application of Naseem et al., Ser. No. 043,928, for a complete disclosure of the Johnson counter and the logic 88.

The latch 104 will also output over the bus 106, which is designated as the A bus, the 11 bit binary word representing the current interval count which, as previously described, is designated as $I_N$. The interval count is then transmitted to the various logic blocks hereinafter described which combine the current interval $I_N$ with the previous three intervals scanned and then compares the sum of those four intervals with the previous four intervals to generate a signal signifying whether they are equal or not. In addition, the logic will generate a four bit binary word representing a character as a result of receiving the interval count $I_N$. As will be described more fully hereinafter, only a portion of the binary characters generated by the decoder chip 24 are valid.

Figure 12:
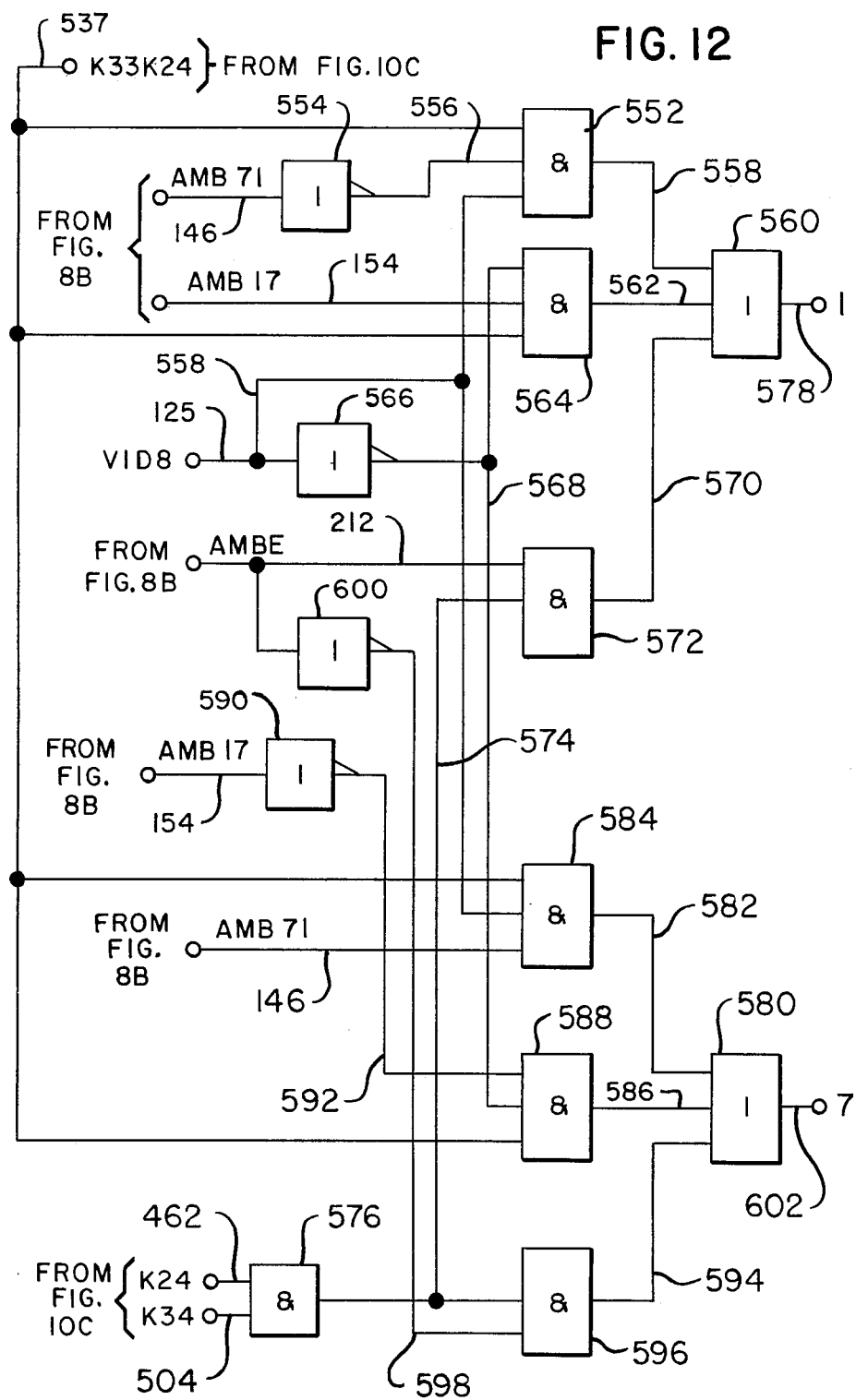
FIG. 12 is a diagram showing the logic circuits for decoding the characters 1 and 7.
Figure 13:
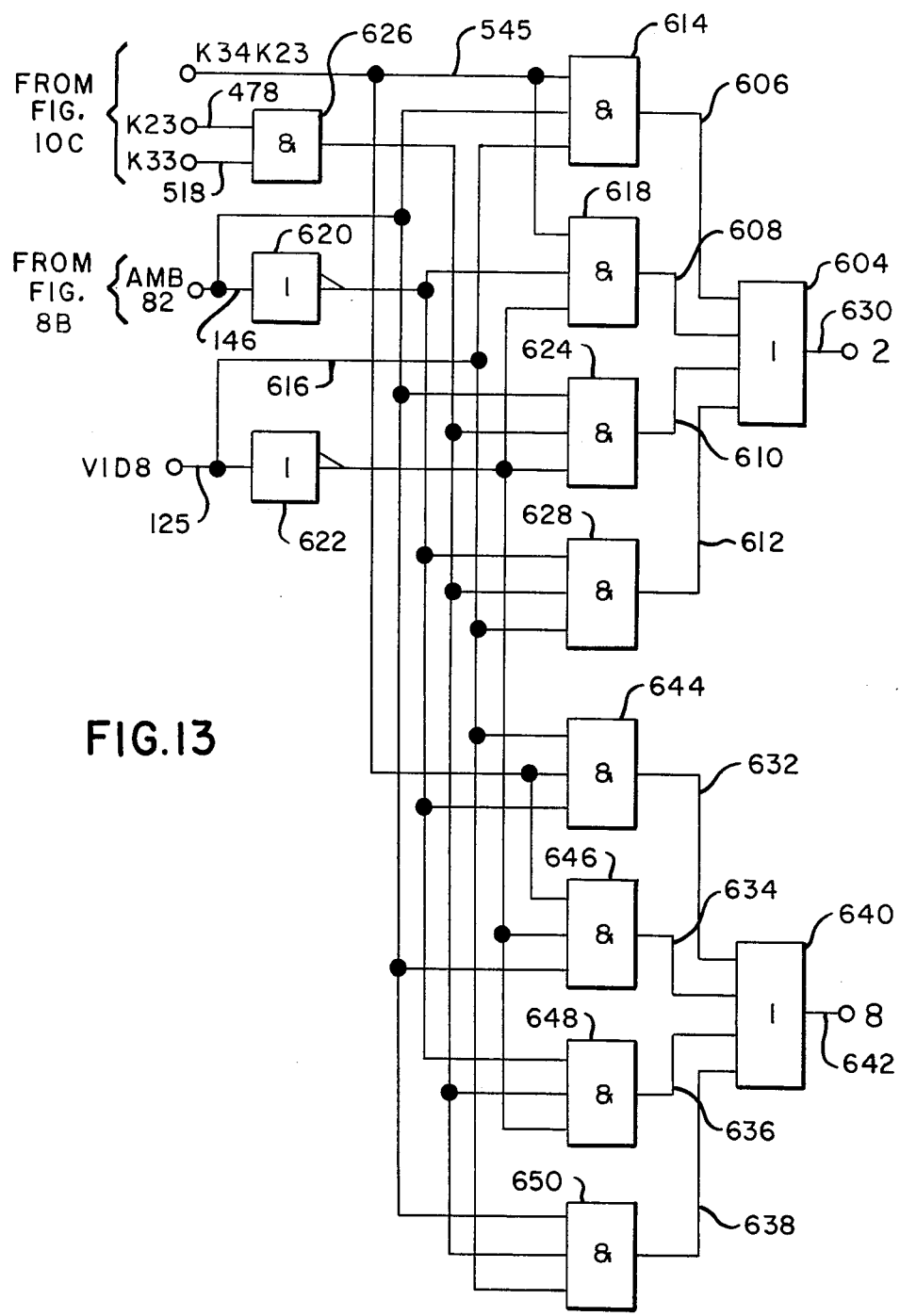
FIG. 13 is a diagram showing the logic circuit for decoding the characters 2 and 8.

The current interval count $I_N$ is transmitted over the A bus 106 to one input of a comparator 136 (FIG. 8A). The interval $I_N$ is also transmitted to a shift register 138 (FIG. 8A) which delays the interval count one clock pulse such that appearing at this time on its output will be the previous interval count $I_{N-1}$. Each functional block disclosed in the logic circuits other than the logic functional elements will delay its input count one clock pulse. Thus, the interval count $I_{N-1}$ appearing on the output of the shift register 138 is transmitted over a B bus 140 to the other input of the comparator 136 whose output signal appearing on line 142 will be high if the interval count $I_{N-1}$ is greater than the previous interval count $I_{N-2}$ which signal is designated as ambiguous (AMB) and is transmitted over line 142 to a seven clock pulse delay shift register 144 (FIG. 8B). The output signal of the shift register 144 designated as AMB 71 is transmitted over line 146 to a portion of a logic circuit to be described hereinafter which determines whether the character represented by the interval count is an ambiguous character. The signal AMB 71 is also transmitted through a shift register 148 whose output signal AMB 82 is transmitted over line 150 in a similar manner as that of the signal AMB 71 for use in determining the ambiguity of the character represented by the interval count in a manner that will be described more fully hereinafter. The output signal AMB 82 of the shift register 148 is also transmitted through a shift register 152 whose output signal $I_{N-10} > I_{N-11}$ designated AMB 17 is transmitted over line 154 for use in a manner similar to that of the signals AMB 71 and AMB 82. As will be described more fully hereinafter, the signal AMB 71 generated in accordance with equation (2) of FIG. 16 while the signal AMB 17 generated in accordance with the equation (4) of FIG. 16, both signals being used to distinguish between the ambiguous characters 1 and 7 (FIG. 12). The signal AMB 82 generated in accordance with the equation (3) of FIG. 16 is used to distinguish between the ambiguous characters 2 and 8 (FIG. 13).

In addition to the signals AMB 71 and AMB 17, a third signal AMBE (FIG. 8E) is generated in accordance with equation (5) of FIG. 16 for use in distinguishing between the ambiguous characters 1 and 7 (FIG. 12) when there is even parity. As shown in FIG. 8A, the 11 bit wide interval count $I_N$ transmitted in parallel over the A bus 106 is coupled to a multiplexer 158 (FIG. 8B) while the 11 bit wide interval count $I_{N-1}$ transmitted over the B bus 140 is coupled to a second multiplexer 160. Both multiplexers 158 and 160 are controlled by the clock pulse VID0 which is transmitted over line 109 (FIG. 8A and 8B) to one side of the multiplexers 158 and 160 and over line 162 and to the other side of the multiplexers 158 and 160 through an inverter 164 and over line 166. Upon the occurrence of the clock pulse VID0 the multiplexer 158 will transmit the 11 bit wide interval $I_N$ over a BA bus 168 to a three clock pulse delay shift register 170 which outputs the interval count over a AJ bus 172 (FIGS. 8B, 8D and 8E) to one input of the comparator 174 (FIG. 8E). When the clock pulse VID0 goes low, the interval count $I_{N-1}$ is transmitted over the B bus 140 (FIG. 8A) to the multiplexer 160 (FIG. 8B) and onto the BA bus 168 for transmission to the comparator 174 in the manner described above. The other input to the comparator 174 receives an interval count developed in the following manner.

The interval count $I_N$ transmitted over the A bus 106 (FIG. 8C) is coupled to the multiplexer 176 while the interval count $I_{N-1}$ transmitted over the B bus 140 is coupled to a second multiplexer 178. Both the multiplexers 176 and 178 are controlled by the clock pulse VID0 applied over lines 109 and 180 and through the inverter 182 over line 184 to the multiplexers 176 and 178 in the same manner as that of the multiplexers 158 and 160 described previously. Upon the occurrence of the clock pulse VID0 being high, the interval count $I_N$ appearing on the A bus 106 is coupled to an AB bus 186 by the multiplexer 176. The interval count $I_N$ is transmitted over the AB bus 186 (FIG. 8D) to a shift register 188 which will delay the interval count one clock pulse and output the delayed interval count $I_{N-1}$ over the AF bus 190 to a second shift register 192 which delays the interval count a second clock pulse which interval count $I_{N-2}$ is then transmitted over the AG bus 194 (FIGS. 8D and 8E) to one input of an adder 196 (FIG. 8E).

The interval count appearing on the AB bus 186 (FIG. 8D) is also transmitted to one input of an adder 198 (FIG. 8D) whose other input receives the same interval count minus the two least significant bits ABQ and AB1 of which the bit AB1 is coupled to the carry input of the adder 198 which outputs an interval count which is 1¼ the count of the interval count appearing on the AB bus 186. Dropping of the two least significant bits in AB bus 186 reduces the interval count to one fourth the value of the interval count appearing on the output of the multiplexer 176, 178 (FIG. 8C). The output count of the adder appears on the AC bus 200 which is coupled to one input of the adder 202 minus the two least significant bits ACQ and AC1 which reduces the count to 5/16 of the output interval count of the adder 198. This count is added to the count appearing on the AF bus 190 which will output a count equal to 21/16 of the interval counts appearing on the inputs of the adder 198. This interval count is equal to the interval count appearing on the AF bus 190 added to the 5/16 count appearing on the AC bus 200. Since the time delays through the adders 198 and 202 is equal to the time delays through the shift registers 188 and 192, the counts appearing at the inputs of the adder 198 and 202 will pertain to the same interval.

The output interval count appearing on the bus 204 is transmitted from the adder 202 (FIG. 8D) to the input of the adder 196 (FIG. 8E). The least significant bit AD0 of the interval count appearing on the AD bus 204 is coupled to the carry input of the adder 196 producing at the input of the adder the interval count equal to 21/32 of the interval count appearing on the output of the adder 202. Appearing on the other input of the adder 196 is the interval count appearing on the AG bus 194 which enables the adder 196 to output an interval count equal to 1 21/32 of the interval counts appearing at its inputs. This interval count is transmitted over the AE bus 206 (FIG. 8E) to the other input of the comparator 174. As shown in FIG. 8E, the most significant bit AE11 of the count appearing on the AE bus 206 is dropped. The comparator 174 will output a signal when the interval count appearing on the A input is greater than the interval count appearing at the B input, which signal is transmitted over the line 208 through a five clock pulse delay shift register 210 which outputs the signal AMBE over line 212 which is used in distinguishing between the ambiguous characters 107 (FIG. 12) in a manner to be described hereinafter.

There will now be described the logic to determine whether the interval appearing on the AB bus 106 is a part of the margin, either the in margin or the out margin; whether the interval plus the four previous intervals constitute a center band; whether that interval plus the three previous intervals constitutes a character, or whether the interval constitutes an error. As previously described, each of these sequences of operation occurs in parallel.

Referring now to FIG. 8C, the interval count $I_N$ appearing on the A bus 106 is transmitted to one input of an adder 214 which adds the 11 bit count $I_N$ to the previous interval $I_{N-1}$ appearing on the B bus 140. Since there is a one clock delay in the adder 214, the output count of the adder 214 will be the count $I_{N-1} + I_{N-2}$ which corresponds to the two previous intervals prior to the interval whose count is $I_N$. The sum of the two previous interval counts will be outputted over the C bus 216 which is transmitted to a series of shift registers 218 (FIG. 8C), 220-226 inclusive (FIG. 8D) and 230 and 234 (FIG. 8E). As previously described, each of the shift registers will delay the input interval count one clock pulse such that the output sum appearing on the Y bus 238 is $I_{N-2} + I_{N-3}$. The output sum appearing on the D bus 240 (FIG. 8D) is $I_{N-3} + I_{N-4}$. The output sum from the shift register 222 (FIG. 8D) appearing on the output Q bus 242 is $I_{N-4} + I_{N-5}$. The sum of the two intervals counts appearing on the output of the shift register 226 and which is transmitted over the X bus 228 is $I_{N-6} + I_{N-7}$ which count is transmitted to a multiplexer 244 (FIG. 8E). The two interval sum is also transmitted over the X bus 228 (FIG. 8D) to a shift register 230 (FIG. 8E) whose output count $I_{N-7} + I_{N-8}$ is transmitted over the F bus 232 to a shift register 234 which outputs the count $I_{N-8} + I_{N-9}$ over the G bus 236 to a multiplexer 246 (FIG. 8E). The multiplexers 244 and 246 are controlled by the clock pulse VID6 which is transmitted over lines 121, 248 to one side of the multiplexers and through the inverter 250 and over line 252 to the other side of the multiplex-ers. The output count transmitted through the multiplexers 244 and 246 will appear on the GX bus 254 for use in identifying the character represented by the interval $I_N$ appearing on the A bus 106 (FIG. 8C).

Referring now to FIG. 8F, it will be seen that the sum of the two previous intervals $I_{N-1} + I_{N-2}$ appearing on the C bus 216 is added to the sum of the two previous intervals $I_{N-3} + I_{N-4}$ appearing on the D bus 240 in the adder 256 which outputs the sum of the four intervals $I_{N-2} + I_{N-3} + I_{N-4} + I_{N-5}$ which sum is designated as $S_{N-2}$. This count is transmitted through a series of shift registers 260, 262 (FIG. 8G), shift registers 254 and 256 (FIG. 8H) and the three clock delay shift register 268 which outputs the sum of the four intervals $S_{N-9}$ over the L bus 270 to one input of the comparator 272 (FIG. 8I).

The other input of the comparator 272 receives a count which is equal to eighty-five percent of the sum of the last four intervals scanned. As shown in FIG. 8F, the E bus 258 will have present thereon the sum of the four intervals $S_{N-2}$ which is transmitted to one input of the adder 274 (FIG. 8G). The sum is also transmitted to the other input of the adder 274 but has its least significant bit E0 coupled to the carry input of the adder thereby reducing the input count to one-half of that of the original sum $S_{N-2}$, resulting in the adder 274 outputting on the N bus a count of 3/2 $S_{N-3}$. The least significant bit N0 of the output count is dropped while the next least significant bit $N_1$ is coupled to the carry input of the adder 278, resulting in the count appearing on the N bus 276 being $\frac{3}{8}$ $S_{N-3}$ which count is applied to one input of the adder 278. The other input of the adder 278 is coupled to the H bus 280 on which appears the count $S_{N-3}$ resulting in the adder 278 outputting over the I bus 282 the count 11/8 $S_{N-4}$, which count is transmitted to one input of the adder 284 (FIG. 8H). Prior to reaching the adder 284, the least significant bit $I_0$ of the count is coupled to the carry input of the adder 284 which receives on the J bus the count $S_{N-4}$ outputted from the shift register 262 (FIG. 8G). The adder 284 will add these two counts and will output the count 27/16 $S_{N-5}$ on the R bus 288 which is transmitted to the other input of the comparator 272 (FIG. 8I). Prior to reaching the input of the comparator 272, the least significant bit $R_0$ of the count is coupled to the carry input of the comparator 272 resulting in the count 27/32 $S_{N-5}$ being applied to the A input of the comparator 272. The comparator will compare the sum of the four interval represented by the count 27/32 $S_{N-5}$ with the previous sum of four intervals represented by the count $S_{N-9}$ to output a signal over line 290 to a two clock delay shift register 292. The output signal of the shift register 292 representing with the sum of the four intervals $S_{N-12} \leq 27/32\ S_{N-8}$ will appear on one output line 294 which is transmitted to one input of the AND gate 296 (FIG. 8J). The output of the gate indicates whether the interval is part of the in center band portion of the bar code (FIG. 1). The same signal is outputted in an inverted form on line 298 of the shift register 292 to one input of an AND gate 300 (FIG. 8J) whose output when high indicates that the sum of the four intervals is within 85% of the sum of the previous four intervals thereby identifying the four intervals as a valid character. The AND gate 300 (FIG. 8J) receives two other signals which are used in determining the validity of the current interval being scanned.

Referring to FIG. 8I, an EXCLUSIVE OR 302 receives the clock pulse VID11 (FIG. 8B) over line 131 and the binary signal MARK (FIG. 8B) over line 134 which, as described previously, will be high if the interval being scanned is a bar or low if the interval being scanned is a space. The output signal of EXCLUSIVE OR 302 is transmitted over line 304 to the AND gate 300 (FIG. 8J) while the third signal inputted to the AND gate 300 is generated by taking the sum of the four intervals $S_{N-2}$ appearing on the E bus 258 (FIG. 8I) and comparing that sum with the sum 27/32 $S_{N-6}$ appearing on the Z bus 306. This latter sum was developed by transmitting the count 27/16 $S_{N-5}$ appearing on the R bus 288 (FIG. 8H) to a shift register 308 which delays the count one clock pulse. The output count of the shift register 288 is transmitted over the bus 306 to the A input of the comparator 310 during which the least significant bit $Z_0$ of the count is coupled to the carry input of the comparator 310 resulting in the count appearing at the A input being equal to 27/32 $S_{N-6}$ which represents 85% of the sum of the four previous intervals to the four intervals represented by the counts $S_{N-2}$. If the sum of the four intervals appearing at the input A of the comparator 310 is greater than the sum of the four previous intervals appearing at the input B of the comparator 310, a high signal will appear on the output line 312 of the comparator 310 which is transmitted through a five clock pulse delay shift register 314 (FIG. 8J). The shift register 314 inverts the signal and outputs the signal over line 316 to the AND gate 300 (FIG. 8J). If the result of the input signals appearing on the input lines 298, 304 and 316 to the AND gate 300 are high at this time, the AND gate 300 will output a high signal on its output line 318 to a four clock pulse delay shift register 320 which will output the control signal EQUAL over line 61 (FIGS. 7 and 8J). As described previously, the binary signal EQUAL when high indicates that the character represented by the hexadecimal number being outputted by the encoder 72 (FIG. 7) is valid.

The logic circuitry shown in FIGS. 8G and 8H will output counts which are used in identifying the character represented by the intervals being inputted into the logic circuits. Included is the count $S_{N-6}$ appearing on the M bus 322 (FIG. 8H) which is the output of the shift register 266 and represents the sum of four intervals. As shown in FIG. 8G, the sum of the four intervals $S_{N-4}$ appearing on the J bus 286 is transmitted to one input of the adder 324 (FIG. 8H). Prior to reaching the adder 324, the five most significant bits $J_0-J_4$ inclusive are dropped, thus producing at the input of the adder 324 the count 1/32 $S_{N-4}$. This count is added to the count 11/16 $S_{N-4}$ appearing at the other input of the adder 324 resulting in the count 23/32 $S_{N-5}$ appearing on the P bus 326. This count is transmitted over bus 326 to the inverted input of the adder 328 prior to which the least significant bit $P_0$ is dropped producing the count 23/64 $S_{N-5}$ being applied to the adder 328. Appearing at the other input of the adder 328 is the count $S_{N-5}$ which appears on the K bus 330. The adder 328 will output the count 41/64 $S_{N-6}$ over the S bus 334 after dropping the most significant bit $S_{11}$ which count is transmitted to the logic shown in FIG. 10A. The count 23/32 $S_{N-5}$ appearing on the P bus 326 is also transmitted through a shift register 336 for outputting the count 23/32 $S_{N-6}$ over the T bus 338 for use in the logic circuitry shown in FIG. 10A, which, as will be described hereinafter, is used in identifying the character represented by the scanned intervals.

There will now be described the logic for determining whether the interval $I_N$ is part of the in margin which, as described previously, comprises the first margin sensed in the scanning direction, and has a minimum width of five and ½ modules. The in margin is determined in accordance with the equation (7) of FIG. 16 in which the sum of the two previous intervals represented by the count $I_{N-1}+I_{N-2}$ appearing on the C bus 216 (FIG. 8F) is inputted into the B input of a comparator 340 which compares this count with a second count developed by adding the count $I_{N-2}+I_{N-3}$ appearing on the Y bus 238 (FIG. 8K). This count is added in adder 342 to a count equal to ¼ the count appearing on the Y bus 238, the latter is accomplished by dropping the least significant bit $Y_0$ and coupling the $Y_1$ bit to the carry input of the adder 342 resulting in the count 5/4 $I_{N-4}+I_{N-3}$ appearing on the V bus 344. This count is transmitted over the V bus 344 to the A input of the comparator 340 (FIG. 8F) prior to which the least significant bit $V_0$ is dropped, together with the $V_1$ bit being coupled to the carry input of the comparator 340 resulting in the count 5/16 $I_{N-4}+I_{N-3}$ being applied to the A input of the comparator 340. The comparator 340 will output a signal if the count appearing at input A is greater than the count appearing at input D, which signal is transmitted over line 346 to one input of an AND gate 348 (FIG. 8G) which also receives the clock pulse VID2 (FIG. 8B) over line 113 and also the inverted clock pulse VID3 which is the clock pulse VID3 (FIG. 8B) transmitted over line 115 is applied through an inverter 350 to the AND gate 348. If a coincidence is found, the AND gate 348 will output the signal MGIN0 over line 352 to a ten clock pulse delay shift register 354 whose output signal MGIN11 is outputted over line 356 to an AND gate 358 (FIG. 8H) whose other input will be always high, which gate will output the high signal INMARG over line 360. As will be described more fully hereinafter, this signal is transmitted to the encoder logic 72 (FIGS. 7 and 15) for use in generating the hexadecimal number output of the encoder.

There will now be described the logic for determining whether the interval being scanned is part of the out margin (FIG. 1) which is the second margin scanned by the slot scanner unit 20 (FIG. 6), which logic is developed in accordance with the equation (9) of FIG. 16. As described previously, the count appearing on the V bus 344 (FIG. 8K) is equal to 5/4 $I_{N-4}+I_{N-3}$, which count is transmitted over the V bus 344 to the A input of a comparator 362. Prior to reaching the comparator 362, the least significant bit $V_0$ is dropped while the bit $V_1$ is coupled to the carry input of comparator 362 producing the count 5/16 $I_{N-4}+I_{N-3}$ at the A input of the comparator 362. The comparator 362 compares this count with the count $I_{N-4}+I_{N-5}$ appearing on the Q bus 242 in which is applied to the B input of the comparator 362. If the count at the input A is greater than the count at the input B, a high signal will appear on the output line 364 of the comparator 362 which signal is transmitted to one input of an AND gate 366 whose other inputs receive a clock pulse VID7 (FIG. 8B) over line 123 and the inverted clock pulse VID6 (FIG. 8B) which signal is transmitted over line 121 through the inverter 368. Upon finding a coincidence between the input signals, the AND gate 366 will output the signal MGOT0 over line 368 to a four clock pulse delay shift register 370 (FIG. 8L) whose output delay signal is transmitted over line 372 to one input of an AND gate 374. Appearing on the other input of the AND gate 374 is the signal signifying that the count $S_{N-12}$ is greater than 27/32 $S_{N-8}$ which signal is transmitted over line 294 (FIG. 8J) from the output of the shift register 292 (FIG. 8I). Upon sensing a coincidence, the AND gate 374 (FIG. 8L) will output a high signal through a four clock pulse delay shift register 376 which outputs the signal OUTMARG over line 378 to the encoder 72 (FIGS. 7 and 15) for use in generating the hexadecimal number.

Simultaneously with determining whether the interval is part of the in or out margin, the logic will also determine if the interval is part of the center band. Referring now to FIG. 8J, an AND gate 380 receives on its inputs a pair of terms K33 or K34 appearing on line 382 and K23 or K24 appearing on line 384. These terms are developed as part of the logic in recognizing the intervals as representing a predetermined character as will be described more fully hereinafter. Upon finding a coincidence between the signals appearing on its inputs, the AND gate 380 will output the signal centerband (CNTRB) over line 386 to a three clock pulse delay shift register 388 which outputs the delayed signal CNTRB-3 over line 390. This signal is transmitted through a second shift register 392 whose delayed signal CNTRB-4 is transmitted over line 394 to one input of the AND gate 296 whose other input receives a signal signifying that the count $S_{N-12}$ is equal to or less than the count 27/32 $S_{N-8}$ over line 294. Upon finding a coincidence, the AND gate 296 will output the signal center band in (CBIN) over line 400 which is used in determining whether the interval is part of the in center band in a manner that will be described more fully hereinafter.

The delayed signal CNTRB-4 appearing on line 394 is also transmitted through a shift register 396 whose output signal CNTRB-5 appears on line 398. The signal CNTRB-5 is also used in the determination of the in center band condition referred to above. The signal CNTRB appearing on the output of the AND gate 380 over line 386 is also transmitted to an input of an AND gate 402 (FIG. 8J) which also receives a delayed signal over line 404 from the shift register 314, representing the output of the comparator 310 (FIG. 8I). The AND gate 402 (FIG. 8J) also receives a signal which is the signal out margin (OUTMARG) appearing on line 380 (FIG. 8L) which signal is transmitted over line 406 through a three clock pulse delay shift register 408, output line 410 through the inverter 412 and over line 414 (FIG. 8L, 8H and 8I) to the AND gate 402 which, upon finding a coincidence between its input signals, will output a high signal over line 416 to a four time delay shift register 418 who outputs the delayed signal centerband out (CBOUT) over line 420 (FIG. 8J).

The signal CBOUT is transmitted to one input of an AND gate 422 (FIG. 8L). As shown in FIG. 8L, the AND gate 422, together with a second AND gate 424 function to determine whether the interval is part of an in center band or an out center band. The output signal out centerband (OUTCB) of the AND gate 422, which signal is generated in accordance with the equation (31) of FIG. 19 receives the signal MARK (FIG. 8B) over line 134 (FIG. 8K and 8L). The AND gate 422 also receives the signal MARK which is delayed one clock pulse when transmitted through a shift register 426 (FIG. 8K) which delayed signal is transmitted over line 428 through an inverter 430 and over line 432 to the AND gate 422. The AND gate 422 will also receive the signal CNTB-3 over line 390 (FIG. 8J), and the signal CBOUT over line 420 (FIG. 8J).

Also inputted into the AND gate 422 is the signal INMARG (FIG. 8H) appearing on line 81, which signal is transmitted through an inverter 434 (FIG. 8L) and to the AND gate 422 over line 436. The signal INMARG (FIG. 8H) appearing on line 81 is also transmitted through a four clock pulse delay shift register 438 (FIG. 8L), and inverter 440 and over line 442 to the AND gate 422. Upon finding a coincidence between each of its input signals, the AND gate 422 will output over line 76 the signal out centerband (OUTCB) for transmission to the encoder 72 (FIGS. 7 and 15) for use in generating the hexadecimal number output of the encoder.

The AND gate 424 (FIG. 8L) on whose output line 75 (FIG. 7) will appear the in centerband signal INCB receives on one of its inputs the signal CBIN (FIG. 8J) over line 400. The AND gate 424 also receives the signal CNTRB-5 (FIG. 8J) over line 398. In addition, the AND gate 424 receives the delayed signal MARK appearing on the output of the shift register 426 (FIG. 8K) and transmitted over line 428; the signal OUTMARG transmitted over line 80 (FIG. 8L) and line 406 through an inverter 433 and line 437, and the output signal of the AND gate 374 (FIG. 8L) which signal is transmitted over line 439, through the inverter 440 and over line 443 to the AND gate 424. Upon sensing a coincidence between the input signals, the AND gate 424 will output over line 75 the in centerband signal INCB which signal is transmitted to the encoder 72 (FIG. 7) for use in generating the hexadecimal number output of the encoder as will be described more fully hereinafter.

Figure 11:
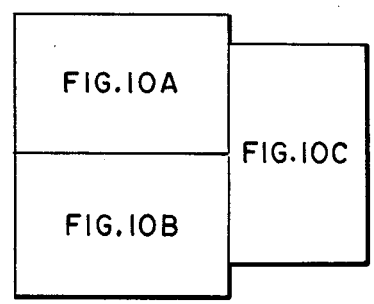
FIG. 11 is a diagram showing the manner in which FIGS. 10A-10C inclusive are arranged with respect to each other to form the logic circuits.
Figure 10B:
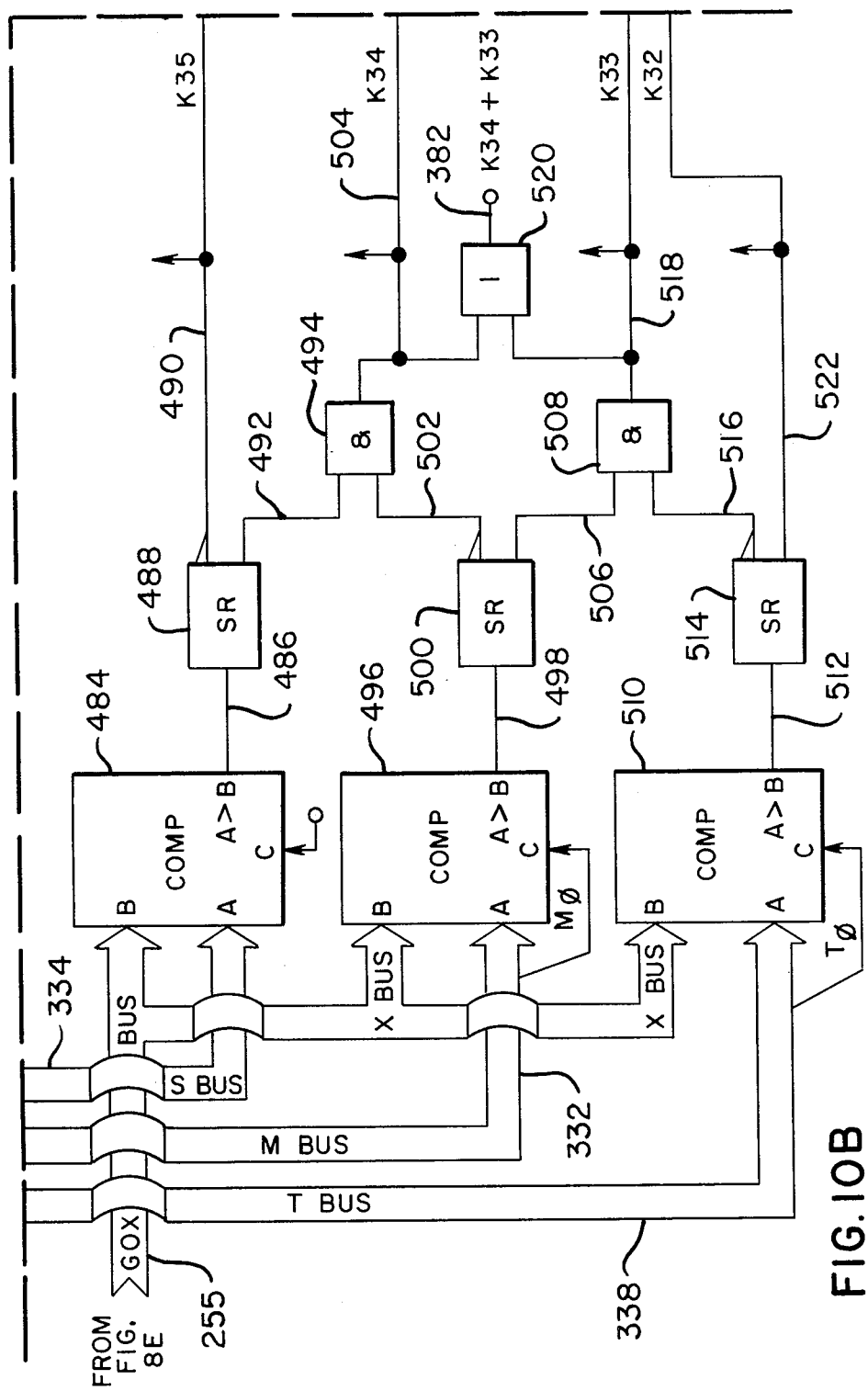
Figure 10C:
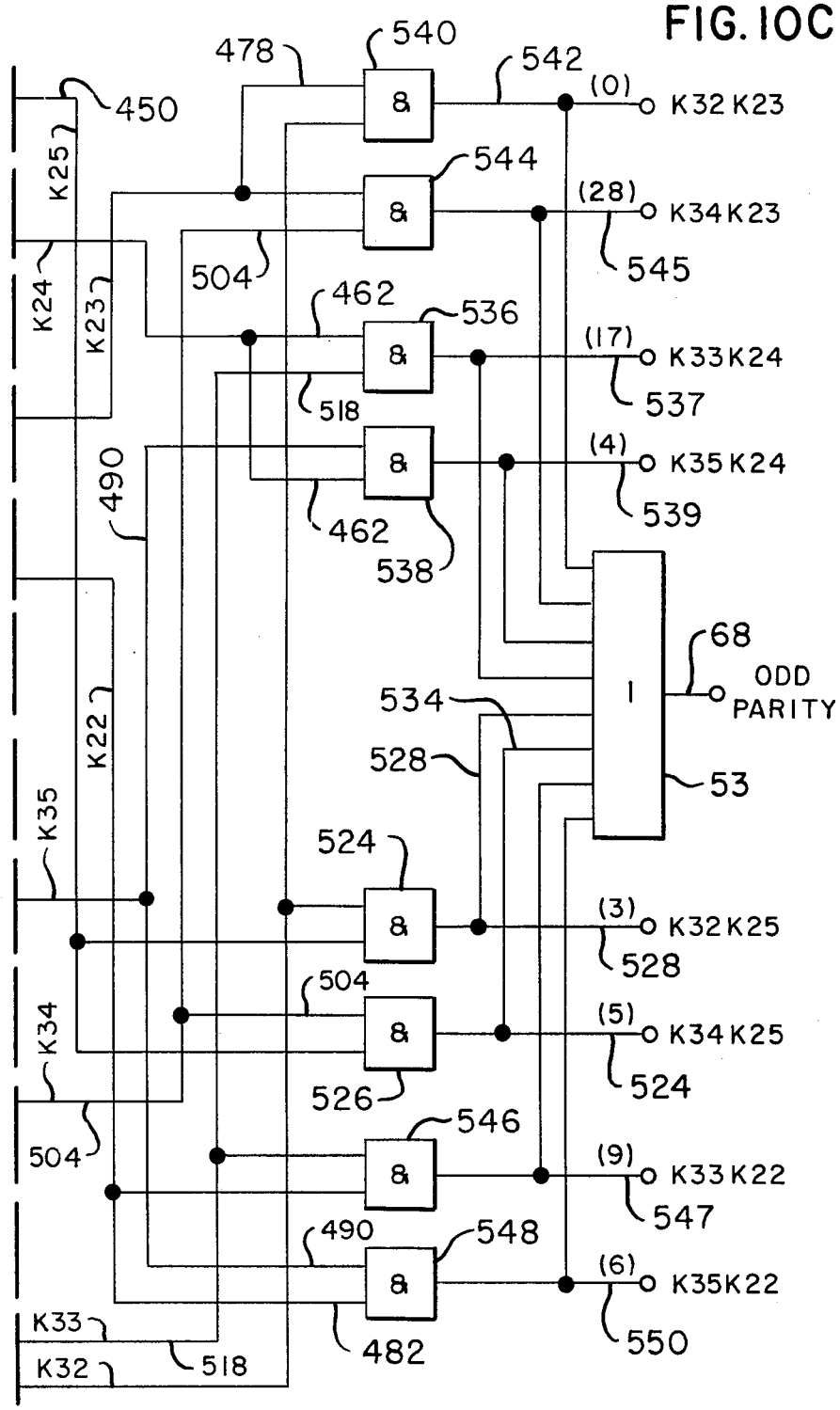

Referring now to FIGS. 10A-10C inclusive, arranged as shown in FIG. 11, there is shown the logic for developing signals used in generating an odd parity signal ODDPARITY and intermediate signals which are used in recognizing a character represented by the interval being scanned. As shown in FIG. 10A, a comparator 444 receives at its B input the count $I_{N-7} + I_{N-8}$ appearing on the S bus 232 (FIG. 8E) and at its A input the count 41/64 $S_{N-6}$ appearing on the S bus 334 (FIG. 8H). The comparator 444 will compare these two counts and output a high signal if the count at input A is greater than the count at input D, which signal is transmitted over line 446 to a shift register 448 which delays and inverts the input signal over line 450, which signal is identified as K25 and whose logic equation (10) is found in FIG. 16. The shift register 448 will output the signal appearing on line 446 after a one clock pulse delay over line 452 to one input of the AND gate 454 whose other input receives a signal generated in a comparator 456. This latter signal is the result of the comparator 456 comparing the count 41/64 $S_{N-6}$ on the S bus 232 (FIG. 8H) with the count $S_{N-6}$ appearing on the M bus 332 (FIG. 8H) in which the least significant bit $M_0$ is coupled to the carry input of the comparator 456.

The comparator 456 will output a signal upon finding the count present at input A greater than the count at input B, which signal is transmitted over line 458 through a shift register 460 which delays and inverts the signal over line 464 to the AND gate 454, which in turn outputs the signal K24 over line 462 upon finding a coincidence between the signals appearing on the input lines 452 and 464. The logic equation (11) for the signal K24 is found in FIG. 16. The shift register 460 will also output the signal appearing on line 458 after a one clock pulse delay over line 466 to AND gate 468 whose other input receives a signal generated in a comparator 470 which compares the count 41/64 $S_{N-6}$ appearing on the S bus 232 with the count 23/32 $S_{N-6}$ appearing on the T bus 328 (FIG. 8H). Upon finding that the count appearing at the input A is greater than the count appearing on the input B, the comparator 470 will output a signal over line 472 to a shift register 474 which delays and inverts the input signal over line 476 to the AND gate 468 which outputs the signal K23 upon finding a coincidence of the signals appearing on its inputs. The logic equation (12) for the signal K23 is found in FIG. 16.

The signal K23 is transmitted over line 478 to one input of the OR gate 480 which also receives the signal K24 from the AND gate 454 over line 462. The OR gate 480 will output either the signal K24 or K23 over line 382 which signal is transmitted to one of the inputs to the AND gate 380 (FIG. 8J) used in generating the center band signal CNTRB-3 as described previously. The shift register 474 will also output the delayed signal K22 over line 482 for transmission to the logic shown in FIG. 10C in which the signal K33, K22 are added to other signals as will be described more fully hereinafter. The logic equation (13) for the signal K22 is found in FIG. 17.

As shown in FIG. 10B, a comparator 484 receives at its B input the count appearing on the GOX bus 255 (FIG. 8E) and the count 41/64 $S_{N-6}$ appearing on the S bus 334 (FIG. 8H) which is coupled to the A input. The comparator 484 will output a high signal over line 486 upon the count at its input A being greater than the count appearing at its input B which signal is transmitted to a shift register 488 which outputs the inverted signal K35 over line 490 and a delayed signal over line 492 to one input of the AND gate 494. The logic equation (14) for the signal K35 is found in FIG. 17. The other input to the AND gate 494 receives a signal generated in a comparator 496 which compares the count appearing on the GOX bus 255 (FIG. 8E) with the count $S_{N-6}$ appearing on the M bus 332 (FIG. 8H). The comparator 496 outputs a high signal over line 498 upon finding the count appearing at input A greater than the count appearing at input B. The signal appearing on line 498 is transmitted to a shift register 500 which delays and inverts the input signal over line 502 to the AND gate 494 which, upon finding the coincidence between its input signals appearing on lines 492 and 502, will output the signal K34 over line 504. The logic equation (15) for the signal K34 is found in FIG. 17.

The shift register 500 (FIG. 10B) will also output the signal appearing on line 498 after a one clock pulse delay over line 506 to one input of an AND gate 508 which receives a signal generated in a comparator 510 which compares the count appearing on the GOX bus 255 with the count 23/32 $S_{N-6}$ appearing on the T bus 338 (FIG. 8H) and outputting a high signal upon finding the count appearing on the T bus greater than the count appearing on the GOX bus. The signal generated by the comparator 510 is transmitted on output line 512 to the shift register 514 which delays and inverts the input signal over line 516 to the other input of the AND gate 508 which will output the signal K33 over output line 518 upon finding a coincidence between the signals appearing on its input lines 506 and 508. The signals appearing on the output lines 504 and 518 are inputted to an OR gate 520 which outputs either of the signals K34 or K33 over output line 382 for transmission to the AND gate 380 (FIG. 8J) for use in generating the signal CNTRB. The shift register 514 will also output the signal K32 over line 532 which is the signal appearing on the input line 512 after a one clock pulse delay, which signal is transmitted to the logic in FIG. 10C for generating signals used in recognizing the character represented by the interval being scanned. The logic equations (16) and (17) for the signals K33 and K32 respectively are found in FIG. 17.

Referring now to FIG. 10C, there is shown the logic for generating an ODD PARITY signal and other signals used in recognizing the character represented by the interval scanned. Appearing on the input line 450 is the signal K25 generated in accordance with the equation (10) of FIG. 16 which signal is transmitted to one input of a pair of AND gates 524 and 526. The other input to the AND gate 524 contains the signal K32 generated in accordance with the equation (17) of FIG. 17 resulting in the AND gates 524 outputting the signal K32 K25 over the output line 528 upon finding the coincidence between the input signals K32 and K25. The signal K32, K25 is also transmitted over line 528 to the OR gate 530 which will output over line 532 the signal ODD PARITY. The AND gate 526 receives the signal K34 generated in accordance with the equation (15) of FIG. 17 over line 504, enabling the AND gate 526 to output over line 534 the signal K34 K25 upon finding a coincidence between the input signals. This signal is also transmitted over line 534 to the OR gate 530 for output as the signal ODD PARITY.

In a similar manner, the signal K24 appearing on the output line 462 and developed in accordance with the equation (11) of FIG. 16 is anded with the signal K33 generated in accordance with the equation (16) of FIG. 17 and appearing on line 518 in the AND gate 536. The AND gate 536 will output the signal K33 K24 upon finding a coincidence between its input signals. The signal K24 is also anded with the signal K35 generated in accordance with the equation (14) of FIG. 17 which appears on the input line 490 to the AND gate 538. The AND gate 538 will output the signal K35 K24 upon finding a coincidence between its input signals. In a similar manner, the signals K32 is anded with the signal K23 generated in accordance with the equation (12) of FIG. 16 and appearing on line 478 to the AND gate 540. The AND signal K32, K23 appears on the output line 542. The AND gate 544 coupled to the input lines 478 and 504 will output the signal K34 K23 upon finding a coincidence of the signals appearing on its input lines.

In the same manner as described above, the AND gate 546 will and the input signals K33 with the signal K22 generated in accordance with the equation (13) of FIG. 17 while the AND gate 548 will and the signals K35, K22 upon finding a coincidence between the signals K35 appearing on its input lines 490 and the signal K22 appearing on the input line 482. Each of the signals being outputted by the AND gates 524, 526, 536, 538, 540, 544, 546 and 548 are transmitted to the OR gate 530 which will output the received signals over line 68 as the signal ODD PARITY for transmission to the frame control chip 28 (FIG. 6).

Figure 15:
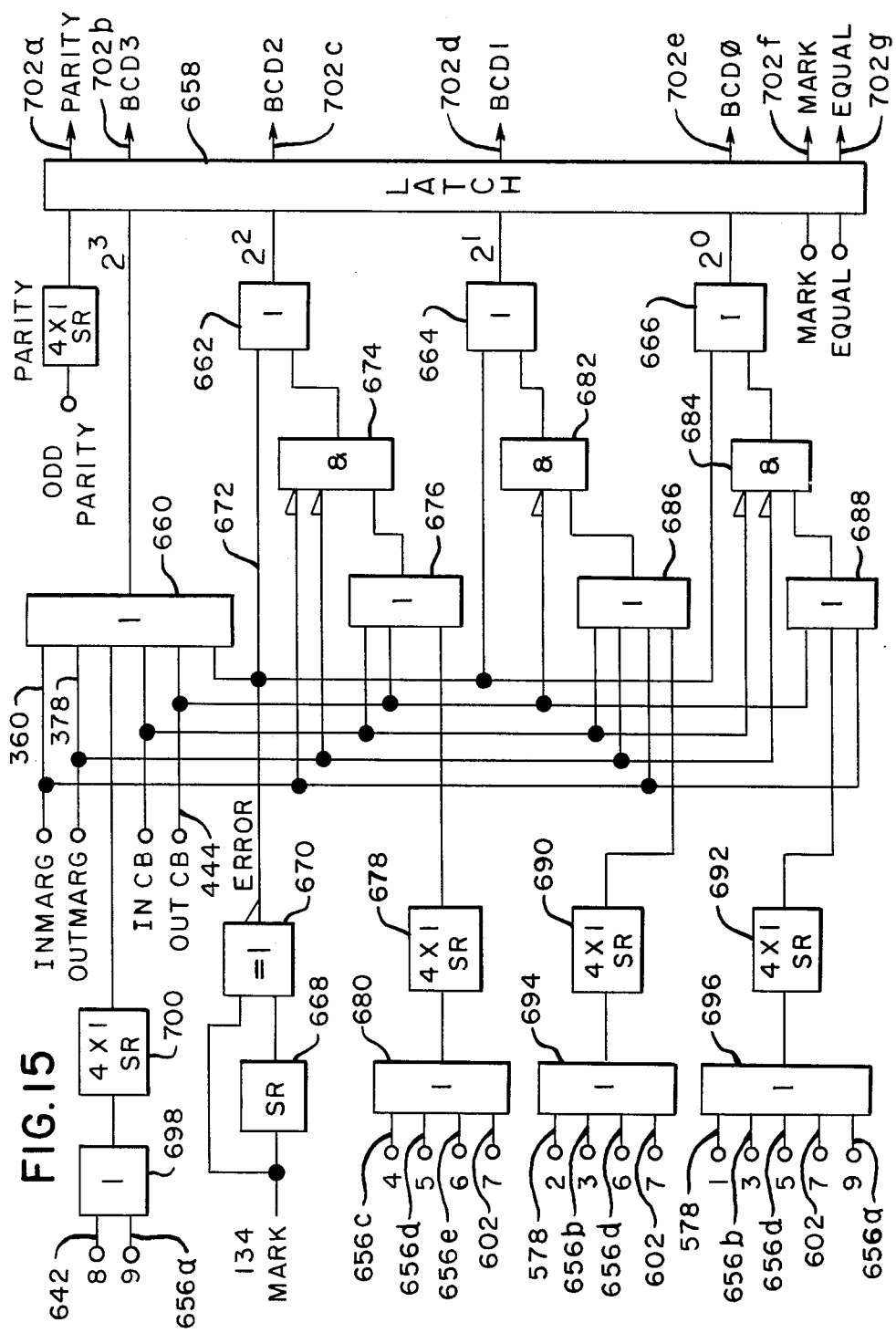
FIG. 15 is a diagram showing the logic circuits for encoding the hexadecimal signals.

Referring now to FIG. 12, there is shown the logic circuitry for distinguishing between the ambiguous characters 1 and 7. Appearing on the input line 537 is the signal K33 K24 (FIG. 10C) which signal is transmitted to an AND gate 552 which also receives the signal AMB 71 (FIG. 8B) over line 146 through an inverter 554 and over line 556 to the AND gate 552. The AND gate 552 also receives over line 558 the clock pulse VID8 (FIG. 8B) over line 125. Upon finding a coincidence between the input signals, the AND gate 552 will output a high signal over line 558 to an OR gate 560 which also receives a signal generated over line 562 from an AND gate 564. The AND gate 564 receives over line 154 the signal AMB 71 (FIG. 8B) together with the signal K33 K24 over line 537 plus the clock pulse signal VID8 which is transmitted through an inverter 566 and over line 568 to the AND gate 564. The OR gate 560 also receives the output signal generated over line 570 from an AND gate 572. The AND gate 572 will output a high signal upon finding a coincidence between the signal AMBE (FIG. 8E) appearing on its input line 212 and a signal appearing on its input line 574 generated by an AND gate 576 which receives the signals K24 over its input line 462 and the signal K34 appearing on its input line 504. Each of these signals, when applied to the OR gate 560, will result in the OR gate 560 outputting a high signal indicating that the interval being scanned combined with the three previous scanned intervals represent the character 1, which signal is transmitted over line 578 to the encoder 72 (FIG. 7 and FIG. 15). The logic equation (24) for the character 1 is found in FIG. 18.

In a similar manner, the OR gate 580 (FIG. 12) receives on one of its input lines 582 a signal generated by an AND gate 584 upon finding a coincidence between the signals J33 K24 (FIG. 10C) appearing on the input line 537, the signal AMB 71 (FIG. 8B) appearing on the input line 146, and the clock pulse VID8 (FIG. 8B) appearing on line 558. The OR gate 580 also receives on its input line 586 a signal generated in an AND gate 588 upon finding a coincidence between the signal AMB 17 transmitted over line 154 through an inverter 590 and over the input line 592 and the signal K33 K24 appearing on the input line 537. The third signal inputted into the OR gate 580 and which appears on the input line 594 is generated in the AND gate 596 upon finding a coincidence between the signal generated in the AND gate 576 when there is a coincidence between the signals K24 and K34, together with the signal appearing on line 598 which comprises the signal AMBE appearing on the input line 212 and transmitted through the inverter 600.

It will be seen that when any of the signals AMBE (FIG. 12) appearing on line 212, AMB17 appearing on line 154 and signal AMB71 appearing on line 146 are high, together with the high signals K24 and K34 appearing on lines 462 and 504, respectively, the OR gate 580 will output a high signal over line 602 to the encoder 72 (FIGS. 7 and 15) indicating that the numeral being scanned combined with the three previous scanned intervals represents the character 7. The logic equation (25) for the character 7 is found in FIG. 18).

Referring now to FIG. 13, there is disclosed logic circuitry for determining between the ambiguous characters 2 and 8 in accordance with the logic equations (26) and (27) (FIG. 18) respectively, in a manner similar to that described previously with respect to the ambiguous numbers 7 and 1. For the logic to select the ambiguous character 2, an OR gate 604 has to have the signals appearing on any of its four input lines 606–612 inclusive to be true. The input line 606 is the output of an AND gate 614 which receives the signal K34, K23 (FIG. 10C) over the line 545, the signal AMB82 (FIG. 8B) over line 146 and the delayed clock signal VID8 (FIG. 8B) over lines 125 and 616. The input line 608 is the output of an AND gate 618 which, in addition to the receiving the signal K34, K23, receives an inverted signal $\overline{AMB82}$ which is the output of the inverter 620, and the inverted delayed clock signal $\overline{VID8}$ which is outputted from the inverter 622. The input line 610 is the output of the AND gate 624 which receives the signals AMB82, the output signal generated in the AND gate 626, which ANDS the signals K23 and K33 (FIG. 10C) together with the inverted delayed clock signal $\overline{VID8}$. The fourth input line 612 is the output of an AND gate 628 which receives the inverter signal $\overline{AMB82}$, the output of the AND gate 626, together with the delay clock signal VID8. When any of the AND gates 614, 618, 624 and 628 receive all high signals, they will output a high signal over their output lines 608–612 inclusive, respectively, through the OR gate 604 to the output line 630 for transmission to the encoder 72 (FIG. 7 and 15).

In a similar manner, the ambiguous character 8 is selected by having any of the input lines 632–638 inclusive transmit a high signal to an OR gate 640, enabling the OR gate to output a high signal over its output line 642 to the encoder 72 (FIGS. 7 and 15). The input line 632 is the output of an AND gate 644 which receives the signals VID8, K34, K23 and the inverter signal $\overline{AMB82}$. The input line 634 is the output of an AND gate 646 which receives the signal K34, K23, the inverted delayed clock pulse VID8 and signal AMB82. The input line 636 is the output of an AND gate 648 which receives the inverted signal $\overline{AMB82}$, the output of the AND gate 626 and the inverted delayed clock pulse $\overline{VID8}$. The input line 638 which is the output of an AND gate 650 which likewise receives the signal AMB82, the output of the AND gate 626, together with the delay clock pulse signal VID8.

Figure 14:
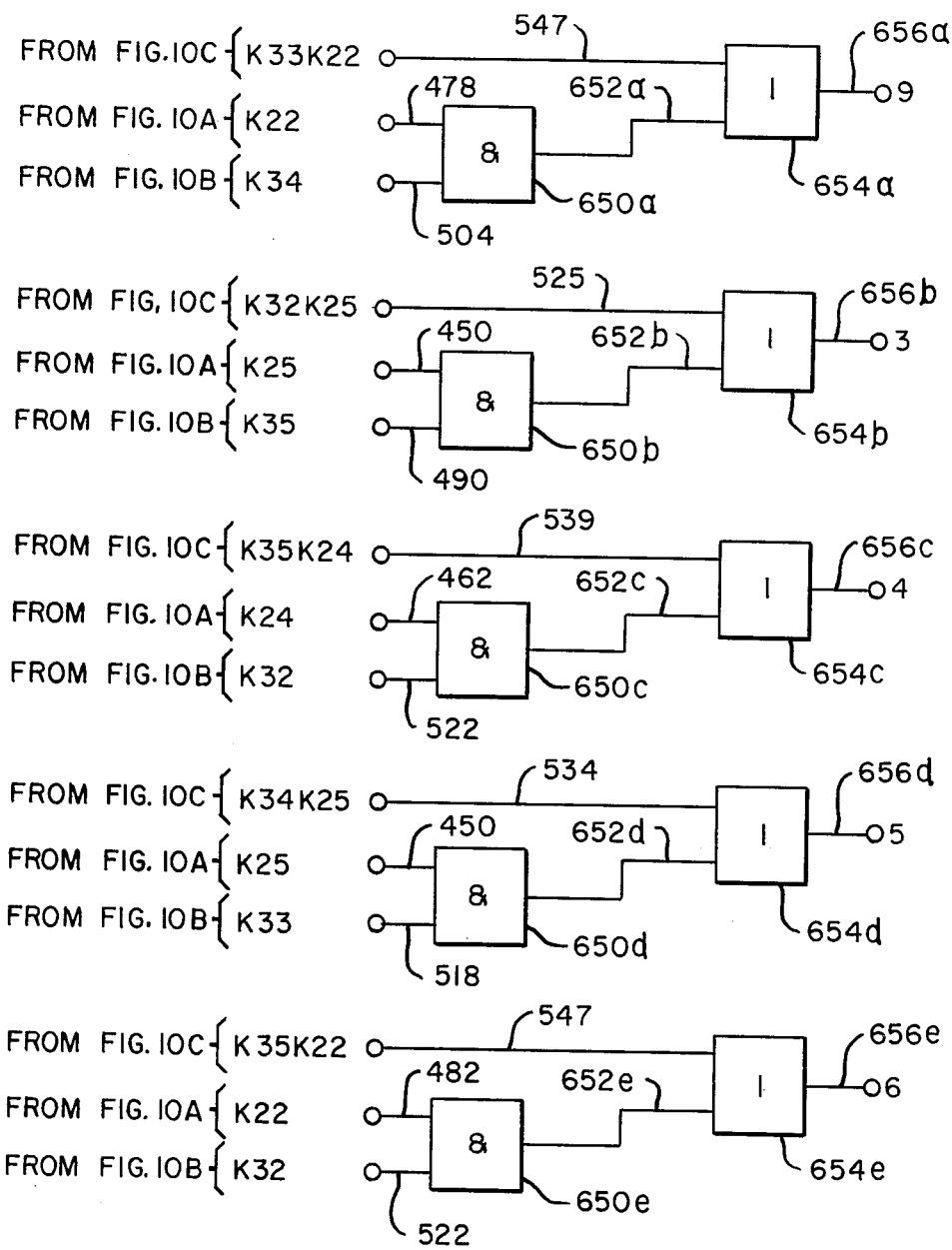
FIG. 14 is a diagram showing the logic circuits for decoding the characters 9 and 3-6 inclusive.

Referring now to FIG. 14, there is disclosed the logic circuits for determining the characters 9, 3, 4, 5, 6, in accordance with the logic equations (23), (19), (20), (21), of FIG. 17 and equation (22) of FIG. 18, respectively. As shown in FIG. 14, each of the circuits comprises an AND gate 650a–e inclusive, each of which receives signals generated in FIGS. 10A and 10B. Each output line 652a–e inclusive of the AND gates 650a–e is coupled to one input of an associated OR gate 654a–e whose other input receives signals generated in FIG. 10C, which signals are designated in FIG. 14. When a high signal appears on either of the input lines to the OR gate 656a–e, the signal will also appear on the output line 656a–e of the OR gates indicating that the interval scanned is one of the characters 9, 3, 4, 5 or 6, which signal is transmitted over the output lines 656a–e to the encoder 72 (FIG. 7 and 15) which outputs a hexadecimal number in the following manner.

Referring now to FIG. 15, there is shown the encoder 72 (FIG. 7) which outputs four hexadecimal encoded BCD bits which may represent any of the decimal characters 0–9 inclusive, together with data representing the in margin, the out margin, the in center band, the out center band and an error signal. In addition, the encoder will output the signal PARITY, MARK and EQUAL. As shown in FIG. 15, the encoder 72 (FIG. 7) includes a latch member 658 coupled to the output of a number of OR gates 660–666 inclusive which represent the hexadecimal encoder BCD bits 0–3 inclusive. The bits BCD 0—4 inclusive are generated in accordance with equations (33)–(36) inclusive (FIGS. 19 and 20) respectively. In addition, the latch 658 will output the signal PARITY generated in accordance with the logic equation (32) of FIG. 19 together with the signal MARK (FIG. 8B) generated in accordance with equation (1) of FIG. 16 and the signal EQUAL (FIG. 8J) generated in accordance with equation (6) of FIG. 16 in the manner described previously. The signal MARK generated over line 134 (FIG. 8B) is transmitted through a shift register 668 to one input of an EXCLUSIVE OR 670 which also receives at its other input over line 134 the signal MARK. If the signal MARK is high after one clock pulse delay, the EXCLUSIVE OR 670 will output the high ERROR signal over line 672 in accordance with equation (37) of FIG. 20 to one input of the OR gate 662. The other input to the OR gate 662 is coupled over line 675 to the output of an AND gate 674 which receives the signals in margin (INMARG), out margin (OUTMARG), in center band (INCB), and out center band (OUTCB), the latter two signals being transmitted through the OR gate 676 which also receives a signal from a shift register 678 which delays its input signal four clock pulses.

As shown in FIG. 15, the shift register 678 is coupled to the output of an OR gate 680 on whose input lines appears signals representing the characters 4, 5, 6, and 7, generated in the manner described previously with respect to FIGS. 12 and 14. In a similar manner, the OR gates 660, 664 and 666 are coupled to the signals in margin (INMARG), out margin (OUTMARG), in center band (INCB), out center band (OUTCB), and the signals representing the characters 1, 2, 3, 5, 6, 7, and 9 as shown in FIG. 15 through the AND gates 682 and 684; the OR gates 686 and 688, the shift registers 690 and 692 and the OR gates 694 and 696. In addition the character signals 8 and 9 are transmitted through an OR gate 698 and a four clock pulse delay shift register 700 for input to the OR gate 660. Each of the OR gates 660-666 inclusive will output signals to the latch 658 resulting in the four bit hexadecimal code word BCD0-BCD3 being outputted over the output lines 698a-d, together with the PARITY signal on the output line 698e, the MARK signal on the output line 680f and the EQUAL signal appearing on the output line 698g of the latch 658, the signals being transmitted to the frame control chip array 28 (FIG. 6), will determine, using the signal EQUAL, if the character being outputted by the latch 658 is valid or not. It will thus be seen that the decoder chip 24, which generates characteristics of the interval scanned in a parallel manner, thus reduces the time required to process the data generated and thereby allows a faster scanning rate to occur.

Although the invention has been described and illustrated with a certain degree of particularity, it is understood that the present disclosure has been made only by way of example, and that numerous changes in the details of construction and the combination and arrangements of parts may be resorted to without departing from the spirit and scope of the invention as hereinafter claimed.

What is claimed is:

1. A system for decoding a coded symbol in which a numerical character is represented by bars and spaces comprising:

means for providing a series of signals representing the transitions between adjacent bars and spaces in said symbol; ;p1 means for generating a binary count for representing the interval between adjacent signals;

means for generating a first control signal identifying the binary count as a bar or space after a predetermined time period delay from the time the binary count is generated;

means coupled to said binary count generating means for applying predetermined relationships to consecutive intervals during said time period;

means for generating valid and invalid characters whenever said predetermined relationships are satisfied during said time period;

and means coupled to said binary count generating means for generating a second control signal during said time period for identifying the invalid and valid characters.

2. The decoding system of claim 1 which further includes means coupled to the output of said binary count generating means for determining the parity of each interval during said time period.

3. The decoding system of claim 1 in which said first generating means comprises a plurality of storage registers coupled in series.

4. The decoding system of claim 3 in which each storage register delays said first control signal one clock period.

5. The decoding system of claim 1 in which said second control signal generating means includes means for adding the binary count of each interval with the binary count of the previous three intervals and comparing means for comparing the sum of the binary count of each four intervals with the previous generated four interval sum for outputting said second control signal when the sums are within a predetermined value of each other, each of said adding and comparing means delaying the input signals a predetermined time period enabling the second control signal to be outputted at the time the first control signal is outputted.

6. The decoding system of claim 5 in which said predetermined value is approximately 85% of each of the sums of each four intervals.

7. The decoding system of claim 5 in which said predetermined value is 27/32 of each of the sums of each four intervals.

8. The decoding system of claim 5 which further includes delay means coupled to the input and output of said adding means enabling said adding means to add the binary count of the present interval to the binary count of the previous three intervals.

9. A system for decoding a coded symbol in which a plurality of numerical characters and a center band separating said characters are represented by bars and spaces, said symbol further including spaces representing in and out margins comprising:

means for providing a series of signals representing the transitions between adjacent bars and spaces in said symbol;

means for generating a binary count representing the interval between adjacent signals;

means for generating a first control signal identifying each binary count as a bar or space;

means for outputtng said first control signal after a predetermined time period delay;

means coupled to said binary count generating means for applying a plurality of predetermined relationships among consecutive intervals during said time period;

means for generating data signals representing each interval either as a valid or invalid character, a margin or a center band during said time period whenever said predetermined relationships are satisfied;

and means coupled to said binary count generating means for generating a second control signal during said time period identifying the valid and invalid characters represented by said data signals.

10. The decoding system of claim 9 in which said first control signal outputting means comprises a plurality of shift registers coupled in series to the output of said first control signal generating means.

11. The decoding system of claim 10 in which said applying means includes adding means and comparing means for applying the predetermined relationships among consecutive intervals, each of said applying means delaying the input signal a predetermined time period.

12. The decoding system of claim 11 in which the adding means and the comparing means delay the input signal one clock pulse.

13. The decoding system of claim 10 in which the output of each of said shift registers is coupled to certain of said applying means enabling said first control signal to be outputted in the same time frame as said data signals.

14. The decoding system of claim 9 in which said second signals generating means includes means for storing the binary counts of three adjacent intervals, said applying means further includes means coupled to the binary count generating means for adding the binary count of the fourth adjacent interval with the binary counts of the previous three adjacent intervals and comparing means for comparing the sum of the binary count of each four intervals with the previously generated four interval sum for outputting said second control signal is both sums are within a predetermined ratio of each other, each of said adding, storing and comparing means delaying the input signal a predetermined time period enabling the second control signal to be outputted in the same time frame as said data signals.

15. The decoding system of claim 14 in which said predetermined ratio is approximately 85% of the sum of each four intervals.

16. The decoding system of claim 14 in which said predetermined ratio is 27/32 of the sum of each four intervals.

17. A method for decoding a symbol having a plurality of numercial characters represented in the symbol by a module comprising a pair of bars and spaces with each bar and space having varying widths for each numercial character comprising the steps of:

scanning the symbol to derive time-based signals representing the transitions between adjacent bars and spaces;

counting at an established rate between successive signals;

identifying each of the counts as a bar or as a space after a delay of a predetermined time period;

adding four succeeding counts together;

comparing asynchronously the accumulated counts with the previous accumulated counts to determine if the accumulated counts are within a predetermined ratio of each other during said time period;

decoding asynchronously the accumulated counts to establish the numerical characters during said time period;

and generating binary signals at the end of said time period indicating the numerical character represented by each count and whether the count is within the ratio.

18. The method as set forth in claim 17 in which the ratio is approximately eighty five percent.

19. A method for decoding a symbol having a plurality of numerical characters represented in the symbol by a module comprising a pair of bars and spaces with each bar and space having varying widths for each numerical character comprising the steps of:

scanning the symbol to derive time-based signals representing the transitions between adjacent bars and spaces;

counting at an established rate between successive signals;

generating a first signal identifying each count as a bar or a space after a predetermined time period delay;

adding each count to the three previous counts during said time period;

comparing asynchronously during said time period the accumulated counts with the previous accumulated counts;

generating a second signal when the accumulated counts are within a predetermined ratio of each other;

applying synchronously a plurality of predetermined relationships to each count during said time period;

generating valid and invalid characters whenever said predetermined relationships are satisfied;

said identifying the valid and invalid characters in accordance with the generation of said second signal.

20. The method as set forth in claim 19 in which the ratio is 27/32 of each other.

* * * * *